United States Patent [19]

Baker

[11] Patent Number: 4,803,729

[45] Date of Patent: Feb. 7, 1989

[54] SPEECH RECOGNITION METHOD

[75] Inventor: James K. Baker, West Newton, Mass.

[73] Assignee: Dragon Systems, Inc., Newton, Mass.

[21] Appl. No.: 34,843

[22] Filed: Apr. 3, 1987

[51] Int. Cl.$^4$ .............................................. G10L 5/00
[52] U.S. Cl. .................................. 381/43; 364/513.5
[58] Field of Search ........................... 381/41, 43, 45; 364/513.5

[56] References Cited

U.S. PATENT DOCUMENTS 4,718,092 1/1988 Klovstad .............................. 381/43
4,718,094 1/1988 Bahl et al. ............................ 381/43

OTHER PUBLICATIONS

"Stochastic Modeling for Automatic Speech Understanding", Baker, Speech Recognition, pp. 522–542, Academic Press 1975.
"Linear Predictive Hidden Markou Models and the Speech Signal", Poritz, pp. 1291–1294, IEEE Int. Conf. Acoustics, Speech, and Signal Processing.
"The 1976 Modular Acoustic Processor (MAP)" Silverman et al., pp. 15–20.
Conference Record, 1976 IEEE Int. Conf. Acoustics, Speech & Signal Processing "Motivation and Overview of Speechlis" Woods, IEEE Trans. Acoust. Speech & Signal Process, vol. ASSP-23, pp. 2–10, 2/75.
"Orginization of Hearsay II Speech Understanding System", Lesser et al., IEEE Trans. Acoust. Speech, and Signal Proc.,vol. ASSP-23, pp. 11–24 2/75.
"The HW/Mo Speech Understanding System", Wolf et al., IEEE Int. Conf. Acoust. Speech & Signal Process, May 9–11, 1977, pp. 784–787.

*Primary Examiner*—Bernard Roskoski
*Attorney, Agent, or Firm*—Edward W. Porter

[57] ABSTRACT

Smoothed frame labeling associates phonetic frame labels with a given speech frame as a function of (a) the closeness with which the given frame compares to each of a plurality of acoustic models, (b) which frame labels correspond with a neighboring frame, and (c) transition probabilities which indicate, for the frame labels associated with the neighboring frame, which frame labels are probably associated with the given frame. The smoothed frame labeling is used to divide the speech into segments of frames having the same class of labels. The invention represents words as a collection of known diphone models, each of which models the sound before and after a boundary between segments derived by the smoothed frame labeling. At recognition time, the speech is divided into segments by smoothed frame labeling; diphone models are derived for each boundary between the resulting segments; and the resulting diphone models are compared against the known diphone models to determine which of the known diphone models match the segment boundaries in the speech. Then a combined-displaced-evidence method is used to determine which words occur in the speech. This method detects which acoustic patterns, in the form of the known diphone models, match various portions of the speech. In response to each such match, it associates with the speech an evidence score for each vocabulary word in which that pattern is known to occur. It displaces each such score from the location of its associated matched pattern by the known distance between that pattern and the beginning of the score's word. Then all the evidence scores for a word located in a given portion of the speech are combined to produce a score which indicates the probability of that word starting in that portion of the speech. This score is combined with a score produced by comparing a histogram from a portion of the speech against a histogram of each word. The resulting combined score determines whether a given word should undergo a more detailed comparison against the speech to be recognized.

29 Claims, No Drawings

FIG. 12

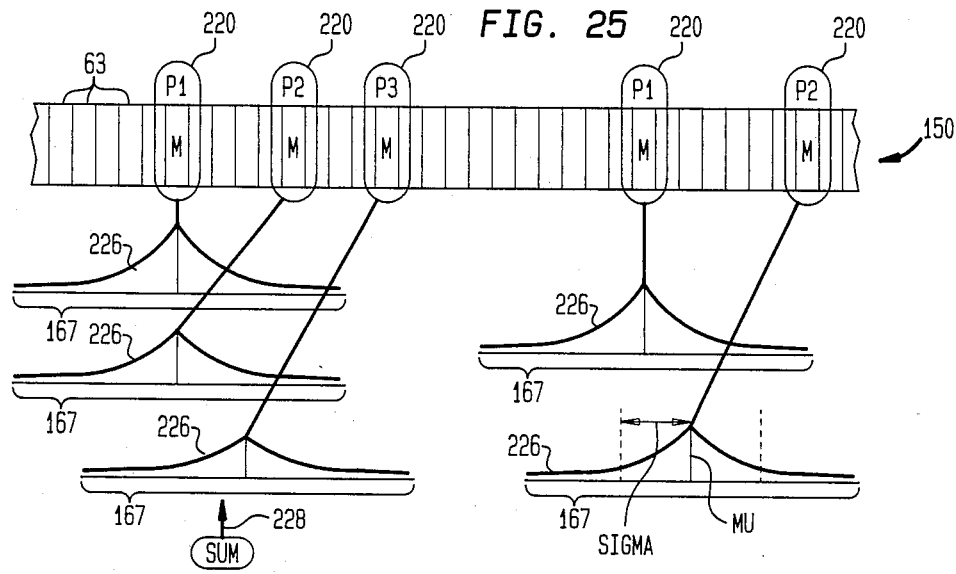
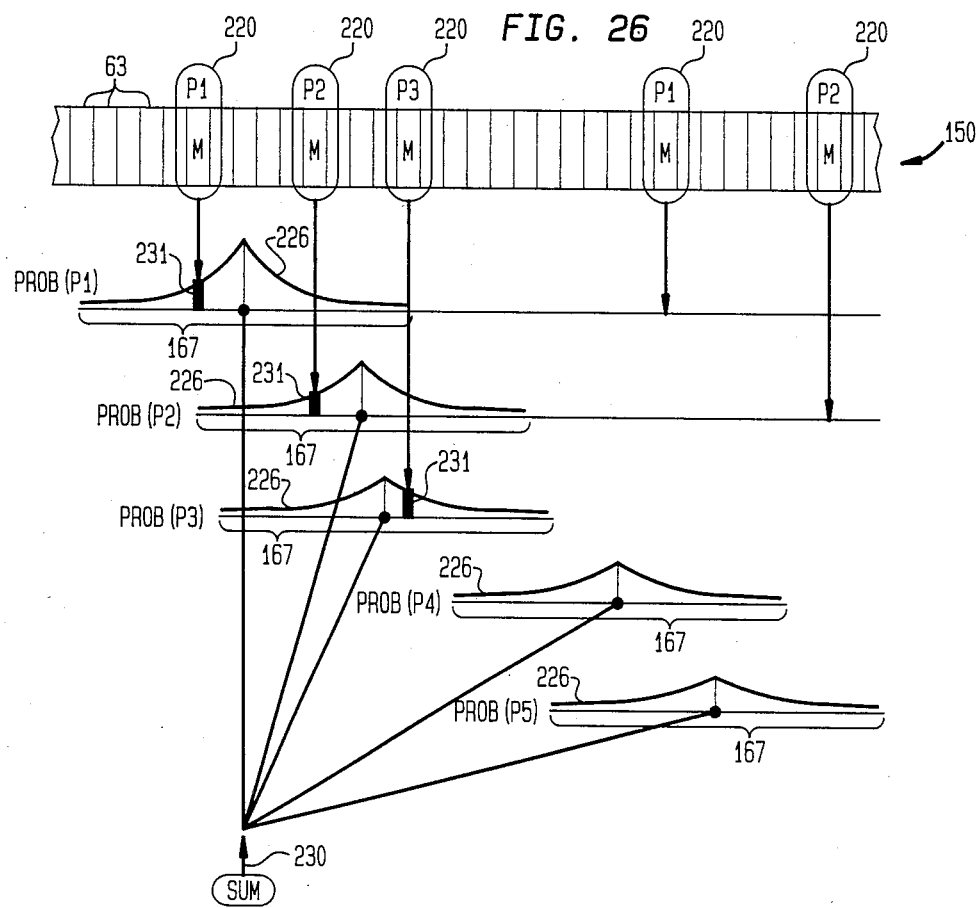

SPEECH RECOGNITION METHOD

FIELD OF THE INVENTION

The present invention relates to speech recognition in general, and, in particular, to methods of performing speech recognition which reduce the amount of computation required to obtain a given level of speech recognition performance or which increase the accuracy of certain forms of speech recognition.

BACKGROUND OF THE INVENTION

A major problem in speech recognition is that of reducing the tremendous amount of computation which such recognition requires. This is desirable so that such recognition can be performed in a reasonable amount of time by relatively inexpensive computers. Since many speech recognition systems operate by comparing a given spoken utterance against each word in its vocabulary, and since each such comparison can require tens of thousands of computer instructions, the amount of computation required to recognize speech tends to grow in proportion to the vocabulary size. This problem is particularly difficult in systems designed to handle the large vocabularies required to recognize normal speech.

Many speech recognition systems use some form of "dynamic programming", or "DP", algorithm. Typically such systems represent speech as a sequence of frames, each of which represents the speech during a brief period of time, such as a fiftieth or a hundredth of a second. Such systems normally model each vocabulary words with a sequence of node models which represent the sequence of different types of frames associated with that word. At recognition time the DP, in effect, slides forward and backward, and expands and contracts, the node models of each vocabulary word relative to the frames of the speech to find a relatively optimal time alignment between those nodes and those frames. The DP calculates the probability that a given sequence of frames matches a given word model as a function of how well each such frame matches the node model with which it has been time aligned. The word model which has the highest probability scores is selected as corresponding to the speech.

DP has greatly improved speech recognition. Its ability to obtain a relatively optimal time alignment between the speech to be recognized and the nodes of each word model compensates for the unavoidable differences in speaking rates which occur in different utterances of the same word. In addition, since DP scores words as a function of the fit between word models and the speech over many frames, it usually gives the correct word the best score, even if the word has been slightly misspoken or obscured by background noise. This is extremely important, because humans often mispronounce words, either by deleting or mispronouncing their proper sounds, or inserting sounds which do not belong in them, and because some form of background noises is unavoidable in most environments in which speech recognition is likely to be used.

DP has a major drawback, however. It requires a tremendous amount of computation. In order for it to find the optimal time alignment between a sequence of frames and a sequence of node models, it has to compare most frames against a plurality of node models. One method of reducing the amount of computation required for DP is to use pruning. Pruning terminates the DP of a given portion of speech against a given word model if the partial probability score for that comparison drops below a given threshold. This greatly reduces computation, since the DP of a given portion of speech against most words produces poor DP scores rather quickly, enabling most words to be pruned after only a small percent of their comparison has been performed. Unfortunately, however, even with such pruning, the amount of computation required in large vocabulary system of the type necessary to transcribe normal dictation is still prohibitively large for present day personal computers.

If the speech to be recognized is continuous speech the computational requirements are even greater. In continuous speech, the type of which humans normally speak, words are run together, without pauses or other simple ques to indicate where one word ends and the next begins. Most humans are unaware of this because our minds are so good at speech recognition that we divide continuous speech into its constituent words without consciously thinking of it. But when a mechanical speech recognition system attempts to recognized continuous speech, it initially has no way of knowing which portions of speech correspond to individual words. Thus it initially has no idea of which portions of speech to compare against the start of word models.

One approach to this problem is to treat each successive frame of the speech as the possible beginning of a new word, and to start performing DP at each such frame against the start of each vocabulary word. But this would require a tremendous amount of computation. A more efficient method used in the prior art only starts DP against new words at those frames for which the DP indicates that the speaking of a previous word has just ended. Although this method is a considerable improvement, there is a need to reduce computation even further by reducing the number of words against which DP is started when there is indication that a prior word has ended.

One such method of reducing the number of vocabulary word against which dynamic programming is started in continuous speech recognition was developed by the inventor of the present invention while formerly employed at IBM. This method associated with each of frame of the speech to be recognized a phonetic label which identifies which of a plurality of phonetic frame model compares most closely to that frame. Then it divided the speech into segments of successive frames associated with a single phonetic label. For each given segment, it takes the sequence of five phonetic labels associated with that segment and the next four segments, and goes to a look up table and finds the set of vocabulary words which have been previously determined to have a reasonable probability of starting with that sequence of phonetic labels. It then limits the words against which dynamic programing could start in the given segment to words in that set.

Although this method greatly reduced computation, the look up table it required used too much memory to make the method practical.

Other schemes have been used for reducing the number of vocabulary words aganst which dynamic programming is performed in discrete, as opposed to continuous, speech recognition. Such prefiltering schemes generally perform a superficial analysis of the separately spoken word to be recognized, and, from that analysis, select a relatively small subset of the vocabulary words as candidates for DP. One such method is disclosed in U.S. patent application Ser. No. 797,249, filed by Baker et al. on Nov. 12, 1985 and entitled "Speech Recognition Apparatus and Method" (hereinafter referred to as Application Ser. No. 797,249). Application Ser. No. 797,249 has been assigned to the assignee of the present application and is incorporated herein by reference. It discloses a method of prefiltering which compares three sets of averaged frame models from the beginning of a separate word to be recognized against a corresponding three sets of averaged frame models from each of the vocabulary words. Based on this comparison, it selects which vocabulary words appear similar enough to the speech to warrant a more detailed comparison.

Although the prefiltering of Application Ser. No. 797,249 significantly improves recognition speed, the embodiment of the prefiltering scheme disclosed in that application is not designed for the recognition of continuous speech. In addition, that prefiltering scheme uses linear time alignment to compare a sequence of models from the speech to be recognized against a sequence of models for each vocabulary word. Unlike dynamic programming, linear time alignment does not stretch or compress one sequence so as to find a relatively optimal match against another. Instead it makes its comparison without any such stretching or compression. Its benefit is that it greatly reduces computation, but its drawback is that its comparisons tend to be much less tolerant of changes in the speaking rate, or of insertions or deletions of speech sounds, than comparisons made by dynamic programming. As a result prefiltering schemes which used linear time alignment tend to be less accurate than desired.

In addition to prefiltering of the type described in Application Ser. No. 797,249, which makes a superficial comparison against each word in the system vocabulary, the prior art has used lexical retrieval to reduce the number of vocabulary words against which an utterance has to be compared. In lexical retrieval information from the utterance to be recognized generates a group of words against which recognition is to be performed, without making a superficial comparison against each vocabulary word. In this application, the term "prefiltering" will be used to include such lexical retrieval.

The HEARSAY speech recognition program developed at Carnegie-Mellon University in the early 1970's used lexical retrieval. It has acoustic models of most syllables which occur in English. When an utterance to be recognized was received, it was compared against these syllable models, producing a list of syllables considered likely to occur in the utterance to be recognized. Then words containing those syllables were then chosen for comparison against the utterance to be recognized.

Speech recognition programs written at Bolt, Beranek, and Newman, have performed lexical retrieval by mapping all vocabulary words onto a common tree, in which branches correspond to phonemes. The root of the tree is the start of the word. Its first branches represent all the different initial phonemes contained in the vocabulary words. The second level branches connected to a given first level branch represent all the second phonemes in the vocabulary words which follow the first phoneme represented by the given first level branch. This is continued for multiple levels, so that words which start with a similar string of phonemes share a common initial path in the tree. When an utterance to be recognized is received, its successive parts are compared with a set of phoneme models, and the scores resulting from those comparisons are used to select those parts of the tree which probably correspond to the word to be recognized. The vocabulary words associated with those parts of the tree are then compared in greater detail against the word to be recognized.

Another method of lexical retrieval is disclosed in U.S. patent application Ser. No. 919,885, filed by Gillick et al. on Oct. 10th, 1986 and entitled "A Method For Creating And Using Multiple-Word Sound Models in Speech Recognition" (hereinafter referred to as Application Ser. No. 919,885). Application Ser. No. 919,885 has been assigned to the assignee of the present application, and is incorporated herein by reference. It discloses a method of prefiltering which uses linear time alignment to compare a sequence of models from the speech to be recognized against corresponding sequences of models which are associated with the beginning of one or more vocabulary words. This method compensate for its use of linear time alignment by combining its prefilter score produced by linear time alignment with another prefilter score which calculated in a manner that is very forgiving of changes in speaking rate or the improper insertion or deletion of speech sounds. This other prefilter score, which is referred to as the "histogram prefiltering" score in Application Ser. No. 919,885, is calculated by labeling each of a plurality of frames from the utterance to be recognized with the label of the phonetic frame model which compares most closely to it. Then each labeled frame has associated with it, for each vocabulary word, the probability that a given frame from the initial portion of that vocabulary word would be associated with that frame's label. These probabilities are combined over successive frames for each vocabulary word to produce the histogram prefilter score for that word.

The prefiltering method described in Application No. 919,885 provides good prefiltering, but the embodiment of that method shown is designed for separately spoken words, rather than continuous speech. In addition, although the so-called "histogram prefiltering method" is very computationally efficient and provides a good compliment to the prefilter score obtained by linear time alignment, its performance is not an optimal.

Several of the prior art prefiltering schemes described above associate phonetic labels with individual speech frames. Although methods for such frame labeling are well known in the art, most of them are not as accurate as desired. For example, random noise is often added to the speech sounds represented by frames, causing those frames to be mislabeled. Also, sampling errors often cause the values of frames to fluctuate. These sampling errors often result because many speech sounds are brief relative to the length of the frames, and the representation of such brief sounds by the frames tends to vary as a function of the relative timing between such sounds and such frames. For example, vowel sounds contains between one hundred to four hundred pulses per second generated by the opening and closing of the vocal cords, with the exact frequency defining the pitch of the speaker's voice. As a result, the frames recorded for a single continuous vowel sound often vary as a function of changes in the relative timing between such pulses and individual frames. The inaccuracies in frame values which result from all these causes not only cause individual frames to be mislabeled, but they also tend to cause any division of the speech into segments based upon such frame labeling to be erroneous.

SUMMARY OF THE INVENTION

It is an object of the present invention to provide speech recognition methods which reduce the amount of computation required to achieve a given degree of speech recognition performance.

It is yet another object of the present invention to provide a speech recognition method for determining the probability that a given word occurs at a given location in the speech which is relatively efficient, but which also is relatively tolerant of changes in speaking rate and the improper insertion or deletions of speech sounds.

It is a further object of the present invention to provide speech recognition methods which are relatively efficient and accurate at selecting which words warrant a computationally intensive comparison against the speech to be recognized.

It is still another object of the invention to provide speech recognition methods which are relatively accurate at associating phonetic labels with each of a sequence of speech frames.

According to one aspect of the present invention can improved method of frame labeling, called "smoothed frame labeling," is provided. It is called smoothed frame labeling because the labels which it associates with frame sequences tend to fluctuate less due to sampling error and background noise than do frames produced by most former frame labeling methods. This method of speech recognition comprises representing speech as a sequence of acoustic frames; storing acoustic frame models which represents classes of sounds; and storing transition probabilities which indicate the probability that frames associated with given acoustic models will neighbor frames associated with particular acoustic models. The method associates acoustic models with individual frames in the speech as a function of (a) the closeness with which a given frame compares to each of a plurality of the acoustic models, (b) an indication of which one or more of the acoustic models most probably correspond with a frame which neighbors the given frame, and (c) one or more transition probabilities which indicate, for one or more acoustic models associated with the neighboring frame, the probability that the given frame is associated with a given acoustic model.

Preferably the acoustic frame models represent at least twenty different phonetic classes of sound. In the preferred embodiment of the invention, the acoustic models associated with frames are used to divide the speech into segments. This is done by associating each acoustic model with a class of one or more such models, and comparing the classes of the acoustic frame models associated with neighboring frames to detect where boundaries occur between regions associated with different classes. Preferably this method is used as part of a prefiltering method which selects which vocabulary words receive a more computationally intensive comparison against the speech.

According to another aspect of the present invention, speech units, such as words, are represented as a collection of diphone models, each of which models the sound before and after a segment boundary that is associated with its a speech unit. To be more accurate, this method comprises storing a model of each of a plurality of speech units. Each of these speech-unit models associates an individual diphone model with each of a plurality of segment boundaries associated with its speech unit. Each such boundary is located between two sound segments, each of which represents a succession of relatively similar sounds associated with the speech unit. And each diphone model includes a pre-boundary model of the sound preceding its associated segment boundary and a post-boundary model of the sound following that boundary. At recognition time, the method divides a portion of speech to be recognized into a plurality of segments; derives diphone models of the boundaries between such segments; and matches the diphone models derived from the speech to be recognized against the diphone models associated with speech-unit models to determine which speech units most probably correspond to the speech to be recognized.

Preferably the segmentation of speech used to derive diphone models is accomplished by comparing the class of acoustic frame models associated with neighboring frames to find boundaries between the regions associated with different classes, as described above. It is also preferred that the diphone models of speech units, which are compared against diphone models from the speech to be recognized, are so-called diphone-type models. Each such diphone-type models represents the acoustic characteristics of similar diphone models derived from the utterances of different speech units.

According to another aspect of the invention a speech recognition method is provided which can be called the combined-displaced-evidence method. Typically this method detects acoustic patterns in the speech, associates with each detected pattern an evidence score for each vocabulary word in which that pattern is known to occur; displaces each such evidence score from the location at which its associated pattern occurs in the speech by the known distance between that pattern and the beginning of that score's associated vocabulary word; and combines the evidence scores for each word in a given portion of the speech to determine which words most probably start in that portion.

A more exact statement of the combined-displaced-evidence method is as follows: The method stores a plurality of acoustic patterns, such as phonetic frame models. It also associates with each such acoustic pattern the occurrences of that pattern which are known to occur in one or more speech units, such as words. For each such known occurrence the method stores the speech unit in which it occurs and a temporal displacement indication which indicates the temporal distance, during utterances of that speech unit, between that occurrence and a given reference point in the speech unit. Usually this given reference point is the start of the speech unit. The method detects a plurality of matches between the acoustic patterns and various portions of the speech to be recognized. Then it produces, in response to each such match, a temporal distribution of evidence scores in association with each known occurrence of the matched acoustic pattern. Each such temporal distribution is produced for the given speech unit in which its known occurrence of the matched pattern occurs, and each such temporal distribution is displaced in the speech relative to its matched acoustic pattern as a function of the temporal displacement indication associated with its known occurrence of the matched pattern. The method further includes calculating a speech-unit-probability score indicating the probability that a given speech unit occurs in the speech in association with a given combining time. This calculation includes combining the evidence scores for the given speech unit, if any, which are associated with the given combining time in the speech. The method includes combining evidence scores for a given speech unit from different temporal distributions which have different locations relative to the speech to be recognized.

In some embodiments, the speech to be recognized is divided into segments in the manner described above; the temporal displacement indications indicate the number of segments which normally separate each acoustic pattern and the reference points in their associated speech units; and the temporal distribution of each evidence score is displaced relative to its associated matched acoustic pattern by a number of segments determined by its associated temporal displacement indication. In other embodiments, the temporal displacement indications indicate the number of frames which normally separate the acoustic patterns and the reference points of their associated speech units; and the temporal distributions of evidence scores are displaced relative to matched acoustic models by a number of frames determined by the temporal displacement indications.

Preferably the speech-unit-probability score calculated for a given speech unit is normalized as a function of the number of acoustic patterns associated with the speech unit. It is also preferred that the acoustic patterns which are associated with speech units and detected in the speech are diphone models of the type described above. Preferably the combined-displaced-evidence method is used to select which speech units receive a more intensive comparison against the speech to be recognized.

In some embodiments of the invention, the temporal distribution of one or more evidence scores which is produced in association with a known occurrence of a matched acoustic model in a given speech unit associates all of its evidence score with just one frame in the speech to be recognized. In such embodiments, the evidence scores for a given speech unit are combined over a combining time which covers a range of frames. In other embodiments, each temporal distribution associates evidence scores with a range of frames. In these embodiments, the evidence scores for a given speech unit which overlap a combining time consisting of a single frame are combined. In some of these embodiments, the temporal distribution causes the amount of the evidence score associated with a given frame in said range of frames to be determined as a function of a probability distribution.

The combined-displaced-evidence method of the present invention can be described in other ways. Basically it relates to a method of speech recognition which calculate a probability score for the occurrence of a given speech unit in a given portion of speech as a function of (a) the evidence found that one or more acoustic models associated with the speech unit match one or more portions in the speech, (b) the location at which the evidence for such matches is found, and (c) the temporal displacement indications associated, for the given speech unit, with the acoustic model for which such evidence is found. Preferably whether or not a contribution is made to a given speech unit's probability score as a result of the evidence found for each of a plurality of matches is independent of what, if any, evidence is found for other matches. Furthermore it is preferred that the amount of the contribution made as a result of the evidence of each match is independent of the amount of the contributions made as a result of the evidence of other matches. It is also preferred that the temporal distribution of one or more evidence scores produced for a given speech unit as a result of a given acoustic match is independent of the temporal distribution produced for other matches.

In one embodiment of the combined-displaced-evidence method, the probability score is calculated for a given speech unit by (1) associating with each acoustic model associated with the speech unit a range of expected times determined relative to a scoring time as a function of the temporal displacement indication associated with each such acoustic model for the given speech unit; (2) producing an evidence score for each acoustic model for which evidence of a match is found during the range of expected times associated with that acoustic model and the given speech unit; and (3) combining the evidence scores so produced for the given speech unit.

According to another aspect of the present invention a histogram prefiltering method is provided which stores a histogram for each of a plurality of speech units. Each such speech unit histograms indicates, for each of a plurality of acoustic models, the total probable number of matches between that acoustic model and a given portion of one or more utterances of that speech unit. The method also includes calculating a histogram for a portion of speech to be recognized which indicates the total probable number of matches between each of the acoustic models and that portion of speech. The method further includes comparing the histogram calculated for the speech against the histograms for each of the speech units to determine which speech-units most probably correspond to the speech to be recognized.

Preferably both the utterances of the speech unit and the speech to be recognized are represented as a sequence of acoustic frames, and the histograms of both are calculated by comparing successive frames in a portion of speech with each of the of acoustic frame models. In one embodiment of the invention, each histogram is calculated by (1) comparing each acoustic model against the frames for which the histogram is calculated; (2) selecting the acoustic models which have the greatest probability of matching each such frame; and (3) recording the frequency with which each acoustic model is selected over the frames for which the histogram is made. In another embodiment, each histogram is calculated by (1) comparing the acoustic models against the frames for which the histogram is calculated; (2) associating a score with each such comparison indicating the probability that the comparison's associated acoustic model corresponds to the sound represented by the comparison's associated frame; and (3) storing a combination of the probability scores associated with each acoustic model over all the frames for which the histogram is made.

In a preferred embodiment, this histogram method is used to recognize continuous speech and the histogram calculated for the speech to be recognized derives most of its information from a sampling window, which is a portion of the speech approximately the same length as the portions of speech from which the histograms of the speech-unit models are made. This histogram is repeatedly re-calculated, with the sampling window being shifted relative to the speech in successive re-calculations, and the resulting histograms calculated for different positions of the sampling window are each compared against the histograms of speech units to determining which speech units most probably correspond to each of those different sampling window positions.

It is also preferred that the histogram method be used for prefiltering, that is, for selecting which one or more speech units receive a more computationally intensive comparison against the speech to be recognized.

The above Summary Of The Invention is provided to point out the important aspects of the present invention. In the interest of brevity, it wording has been made less complete and less exact than that contained in the claims. For a more thorough and more accurate description of the present invention, the reader should refer to the specification and claims that follow.

DESCRIPTION OF THE DRAWINGS

The above stated and other aspects of the present invention will become more evident upon reading the following description of the preferred embodiments in conjunction with the accompanying drawings, in which:

FIG. 12 is an example of the frame labeling which results from the process shown in FIGS. 6-11;

FIGS. 24, 25 and 26 show methods by which alternate embodiments of the present invention locate and combine displaced evidence scores;

DETAILED DESCRIPTION OF PREFERRED EMBODIMENTS

The preferred embodiment of the present invention is a computerized system designed to recognized continuous speech. This system could be run on a wide variety of computers, and could be written in a wide variety of computer languages, provided the computer is provided with circuitry, which is well known, for converting speech into digital signals that can processed by the computer. A version of the invention which has already been tested by the inventor is written in the C programming language and is run on a Compaq Deskpro 386 personal computer manufactured by the Compaq Computer Company of Houston, Tex.

Since the present invention is distinguished from the prior art, not by the hardware on which it is run, or the computer language in which it is written, but rather by the methods which it uses, the following specification describes the invention in terms of those methods.

Figure 1:
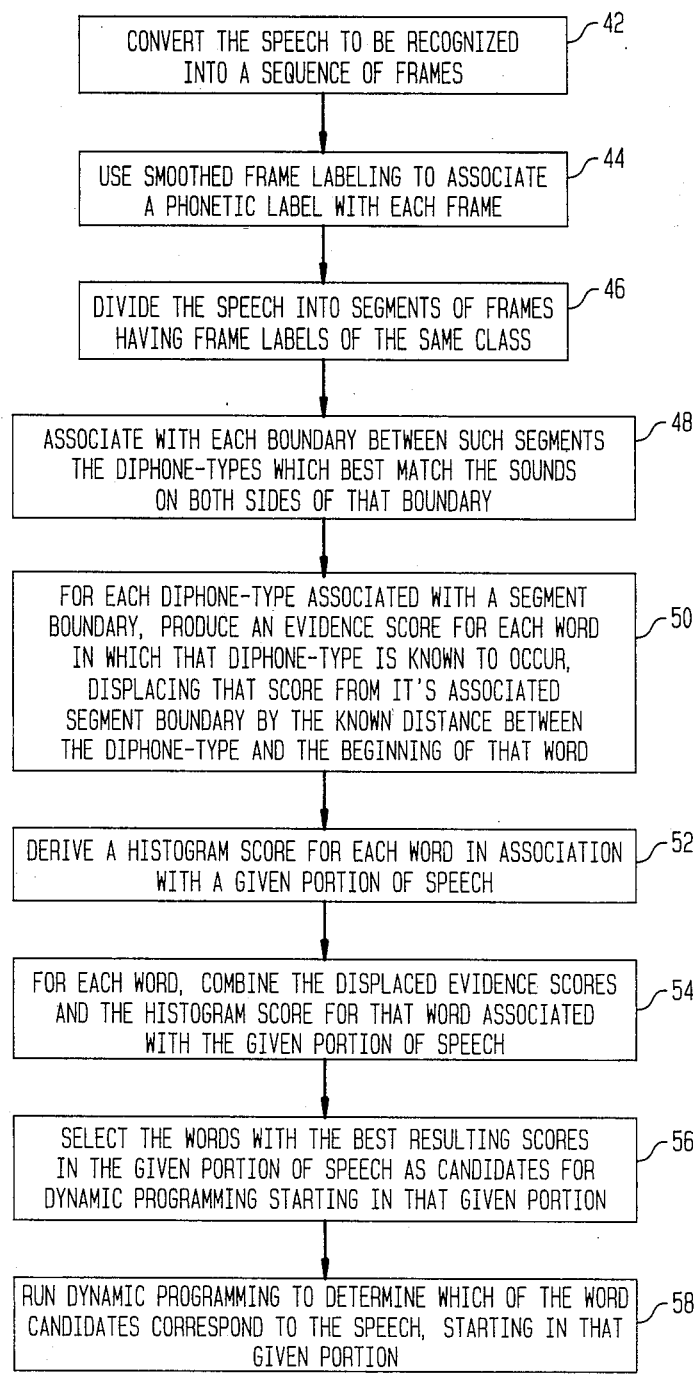
FIG. 1 is a schematic flow diagram of the basic speech recognition steps performed in a preferred embodiment of the present invention.

FIG. 1 provides a simplified overview of the method 40 by which a preferred embodiment of the present invention recognizes continuous speech. This method uses the well known technique of dynamic programming to perform the final recognition of the speech. But it uses prefiltering to greatly limit the number of words which the DP compares against each part of the speech. The method 40 comprises a plurality of steps. When the method is used to recognize a short segment of continuous speech, these step are performed in the generally serial order indicated in FIG. 1. On the other hand, when the method is used to recognize a large amount of speech, the steps are performed in the order shown for each of a plurality of sections of the speech.

The first step of method 40, step 42, converts the speech to be recognized into a sequence of acoustic frames. Each acoustic frame gives the acoustic parameters of the speech during a brief period of time, such as a hundredth of a second. Next, step 44 uses what the inventor calls "smooth frame labeling" to associate a phonetic label with each frame in the speech to be recognized. Each such label identifies the type of speech sound associated with a given frame. Step 46 divides the speech into segments of frames which have phonetic labels of the same class, that is, into segments in which the frames are all either associated with consonant sounds, vowel sounds, or silence sounds. Then step 48 determines which of a plurality of previously calculated diphone-type models match best against the frames on each side of the boundaries between the segments detected by step 46. Each such diphone-type model has two submodels, one representing sound before, and one representing sound after, such a segment boundary.

Once this has been done, step 50 produces, for each of the diphone-type models associated with each segment boundary, a displaced evidence score for each word in which that diphone-type model is known to occur. Each such evidence score is displaced in the speech the from the segment boundary for which it is produced by the known distance between the score's diphone-type model and the beginning of the score's vocabulary word. In addition to step 50, a step 52 is also performed. Step 52 derives a histogram score for each vocabulary word in association with each of a plurality of blocks of frames in the speech. The histogram for each such block is calculated by comparing each of the 40 frames starting with that location against each of a plurality of phonetic frame models. The resulting histogram is then compared against a corresponding histogram associated with each vocabulary word. A score which indicates the similarity of the histogram for the given block of frames and each of the vocabulary words is then associated with that block.

Once both the evidence scores and the histogram scores have been calculated for a block of frames, step 54 combines, for each word, all the displaced evidence scores for that word and the histogram score for that word associated with that block. As a result, step 54 produces for each block of frames a score which indicates the probability that each vocabulary word starts in that block. Then step 56 selects, for each such block of frames those words with the heat probability scores and uses those words as candidates for dynamic programming starting in that block. Finally step 58 runs dynamic programming against such word candidates to determine which of them most probably corresponds to the actual speech.

Referring now to FIGS. 2 through 12, the smoothed frame labeling, which is part of the method of the present invention, will be explained.

Figure 2:
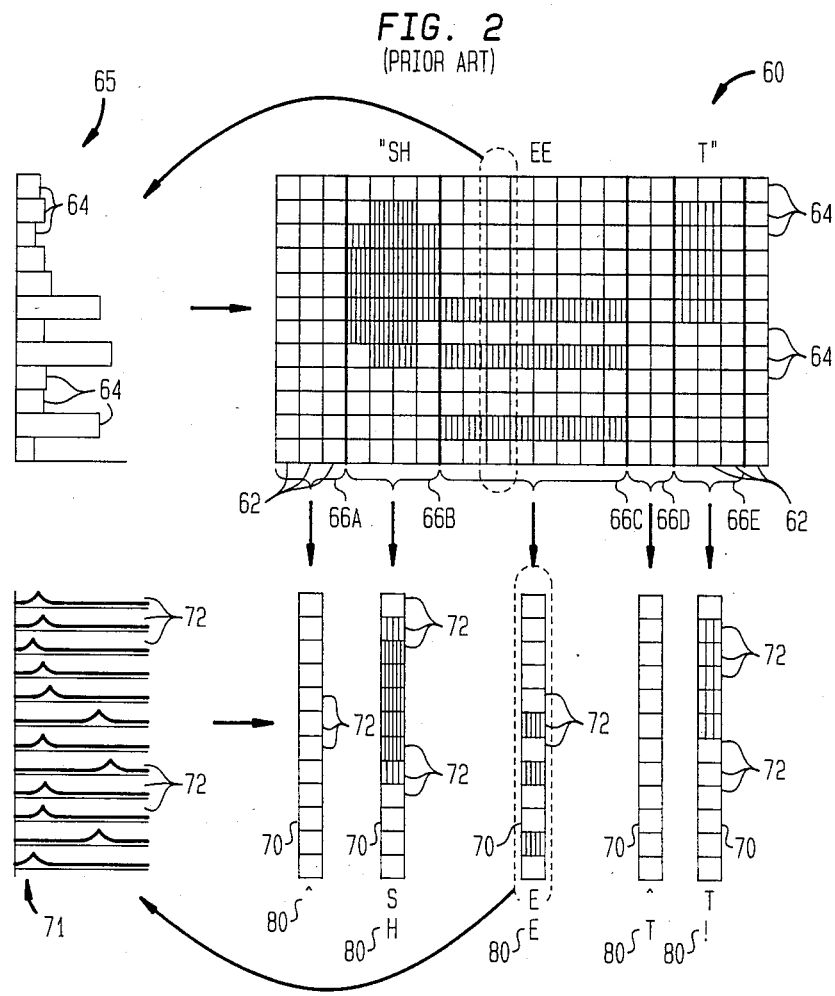
FIG. 2 is a schematic representation of how phonetic frame models can be derived from samples of speech.

Before smoothed frame labeling can be used to associate phonetic frame models with the frames of a portion of speech, those models must first be derived. FIG. 2 illustrates the method of deriving such phonetic frame models used in the embodiment of the invention which has been tested by the inventor. In this method, a sequence 60 of acoustic frames 62 are spoken for each of a plurality of words. In the example of FIG. 2 the sequence 60 represents a training utterance of the word "sheet." Methods for converting the sound of human speech into such sequences of acoustic frames are well known in the speech recognition arts.

In FIG. 2 each of the frames 62 is represented as having only 12 spectral parameters 64, as is indicated in the bar graph 65 of one such frame a the top left of FIG. 2. But in the actual embodiment of the invention tested by the inventor, each frame is comprised of 24 spectral parameters, each indicating the energy in one of 24 frequency bands; 12 slope parameters, each indicating the extent to which the frequency in one of 12 frequency bands is going up or going down; and 12 difference parameters, each indicating the extent to which the energy in one of 12 frequency bands is going up or going down. In this embodiment, a separate frame is produced to represent the sound during each one hundredth of a second. For a more detailed description of a method for calculating acoustic frames, please refer to the above mentioned Application Ser. No. 797,249. For a more detailed description of slope parameters and difference parameters of the type just described, please refer to a U.S. patent application entitled "Method For Speech Analysis and Speech Recognition," filed by Bamberg et al., which application has the same filing and execution date as the present application, is assigned to the assignee of the present application, and is incorporated herein by reference.

Once a sequence of frames representing a word has been derived, it is graphically displayed on a computer screen in a form similar to that shown at the top of FIG. 2. As a result, the spectral parameters associated with each frame form a type of spectrogram, in which time is represented along the horizontal axis, frequency of the spectral parameters is represented along the vertical axis, and the amplitude of sound at each frequency and time is represented by the degree of darkness. Once the sequence of frames has been displayed as a spectrogram, a person knowledgeable in the speech recognition arts can divide it into segments which represent different speech sounds. This can be done because different phonetic sounds have their energy distributed across different frequencies. In the example shown, the initial segment of the speech 66A is associated with silence. The second segment, 66B, has a frequency pattern associated with the "sh" sound; the third segment, 66C, has a frequency pattern associated with the "ee" sound; the fourth segment, 66D, has the pattern of the brief silence associated with the "stop" pause produced with the speaking of the letter "t". Finally, the segment 66E has a pattern associated with the stop release which is caused when the flow of air, which is momentarily stopped during speaking of the "t", is released.

Figure 3A:
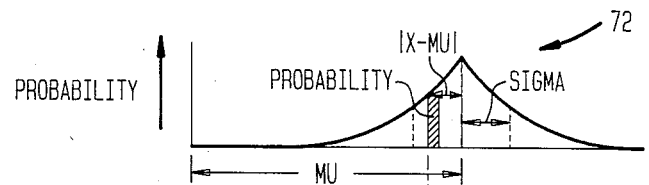
FIG. 3a is a schematic representation of one dimension of an acoustic frame model of the type shown in FIG. 2.
Figure 3B:
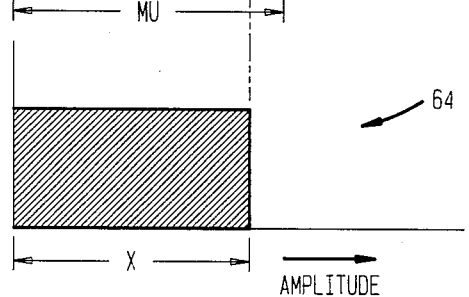
FIG. 3b is a schematic representation of a corresponding parameter from a frame of the sample speech shown in FIG. 2.

Once the frames of a training utterance have been divided into segments, a computer program is used to combine all the frames in each segment to form a phonetic frame model 70 for that segment. As is indicated in the graphical illustration 71 at the bottom left of FIG. 2, each such phonetic frame model has a separate dimension which corresponds to each of the parameters 64 in the frames 62. Each such dimension has the general form indicated in FIG. 3A. It has a mu, which, in the preferred embodiment, is the average value of its corresponding parameter in each of the frames which have been combined to form that model, and a sigma, which in the preferred embodiment is the absolute deviation of those parameters values. It is assumed that each dimension of the phonetic frame model has a Laplacian probability distribution. This assumption simplifies the computation and storage required to represent each such dimension, since it lets each such dimension be represented by the two variables, mu and sigma. As is indicated by the combination of FIGS. 3A and 3B, the height of the Laplacian probability distribution for any given value of its corresponding parameter 64 indicates the likelihood, according to that distribution, that a parameter with such a value would be generated by the sound represented by that probability distribution.

When each such phonetic frame model 70 is made, the person making it gives it a phonetic label 80. Each such label is comprised of one or more alphanumeric characters which are preferably selected so as to make it easy for a person reading a string of such labels to understand the sequence of speech sounds they represent.

The process illustrated in FIG. 2 is performed until a model 70 has been derived for most or all of the common speech sounds. Preferably at least twenty phonetic frame models are developed. In the embodiment of the invention which the inventor has tested, the process of FIG. 2 was used to derive several hundred phonetic frame models, but for purposes of smooth frame labeling the inventor used only the first forty-four of these models. The labels of these forty-four phonetic frame models are listed in Table 1.

TABLE ONE

| Label | Associated Sounds |
|---|---|
| . | silence |
| uh | "uh" as in "up" |
| f | weak fricatives such as "f", "th", or "v" |
| t! | stop releases ("b", "p", "d", "t", "k", and "g") |

TABLE ONE-continued

| Label | Associated Sounds |
|---|---|
| ue | "ue" as in "true" |
| ae | the vowel sound in "at" |
| n | nasals such as "n", "m", or "nag" |
| ee | long "e" |
| ^y | fading sound at end of word, such as "y" offglide |
| f | another label for weak fricatives |
| ohr | "o" preceding an "r" |
| er | steady state "er" |
| r | an "r" sound |
| s | "s" |
| dh | voiced "th" or an "m" with formant structure |
| aw | as in "awful" |
| y | "y" as in "you" |
| yu | glide between "y" and "ou" as in "you" |
| w | "w" |
| we1 | start of a glide between "w" and a front vowel |
| we2 | completion of glide between "w" and a front vowel |
| el | glide between front vowel and an "l" |
| l | "l" |
| ihee | transition between long "i" and long "e" |
| er | another label for "er" |
| r | another label for "r" |
| ae1 | first part of the "a-e" diphthong as in "pay" |
| t | stop pause ("b", "p", "d", "t", "k", and "g") or noise |
| t! | another stop release |
| n1 | another nasal label (for "n", "m", or "nag") |
| ah | "a" as in "father" |
| sh | "sh" |
| sh | another "sh" label |
| le1 | glide from "l" to a front vowel |
| l>p | "l" following a "p" |
| r?p | "r" following a "p" |
| r1 | a type of "r" sound |
| re1 | glide from "r" to a front vowel |
| oh | steady state "oh" |
| er1 | a type of "er" sound |
| ng | "ng" |
| l1 | an "l" sound |
| ae2 | "a" as in "that" |
| r2 | another "r" sound |

It should be understood, that in other embodiments of the invention, more sophisticated schemes for deriving an alphabet of phonetic labels can be used. For example, an automatic segmentation and clustering schemes is described in U.S. patent application Ser. No. 862,275, filed on May 12, 1986 by Gillick et al. and entitled "A Method For Representing Word Models For Use In Speech Recognition" (hereinafter referred to as Application Ser. No. 862,275). Application Ser. No. 862,275 is assigned to the assignee of the present application and is hereby incorporated herein by reference. Such automatic segmentation and clustering schemes could be used to automatically derive a set of phonetic frame models.

Figure 4:
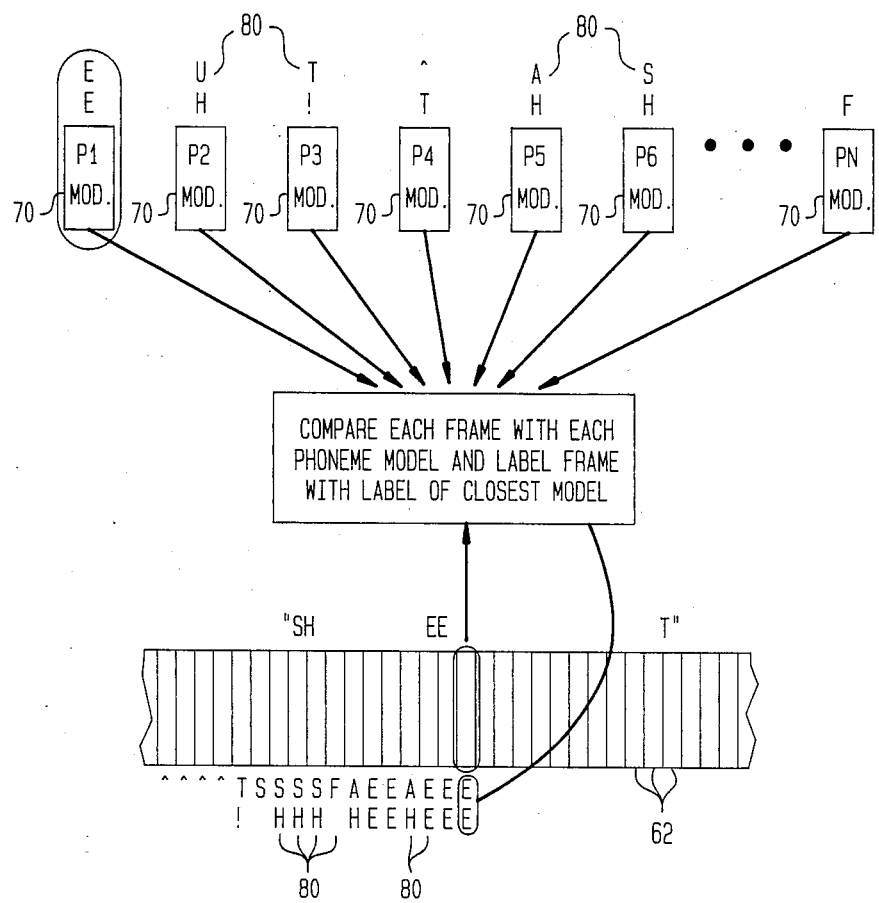
FIG. 4 is a schematic representation of how speech frames are labeled by comparing each frame with a plurality of phonetic frame models of the type derived in FIG. 2.

Referring now to FIG. 4, once a set of phonetic frame models 70, such as the forty-four models whose labels are shown in Table 1, have been derived, a computer uses these models to label each of the frames in a relatively large body of sample speech. This is done by comparing each of the frames 62 in the speech with each of the phonetic models 70 and associating with each such frame the label 80 of the phonetic model to which it compares most closely. In the preferred embodiment, this comparison process is performed by calculating a likelihood score for the comparison of each frame against each phonetic frame model. Each such likelihood score indicates the probability that a given frame belongs to the class of sounds described by the probability distribution of a given phonetic model. It does this by comparing each parameter 64 of the frame against its corresponding dimension 72 of the phonetic model, in the manner indicated by the combination of FIGS. 3A and 3B, to determine the likelihood that the value of the given parameter would be generated by the probability distribution of that dimension of the model. The resulting likelihoods produced for each of a frame's parameters are combined to form such a likelihood score for the frame as a whole. For a more detailed description of the calculation of such likelihood scores, please refer to the above mentioned U.S. patent application Ser. No. 797,249.

Figure 5:
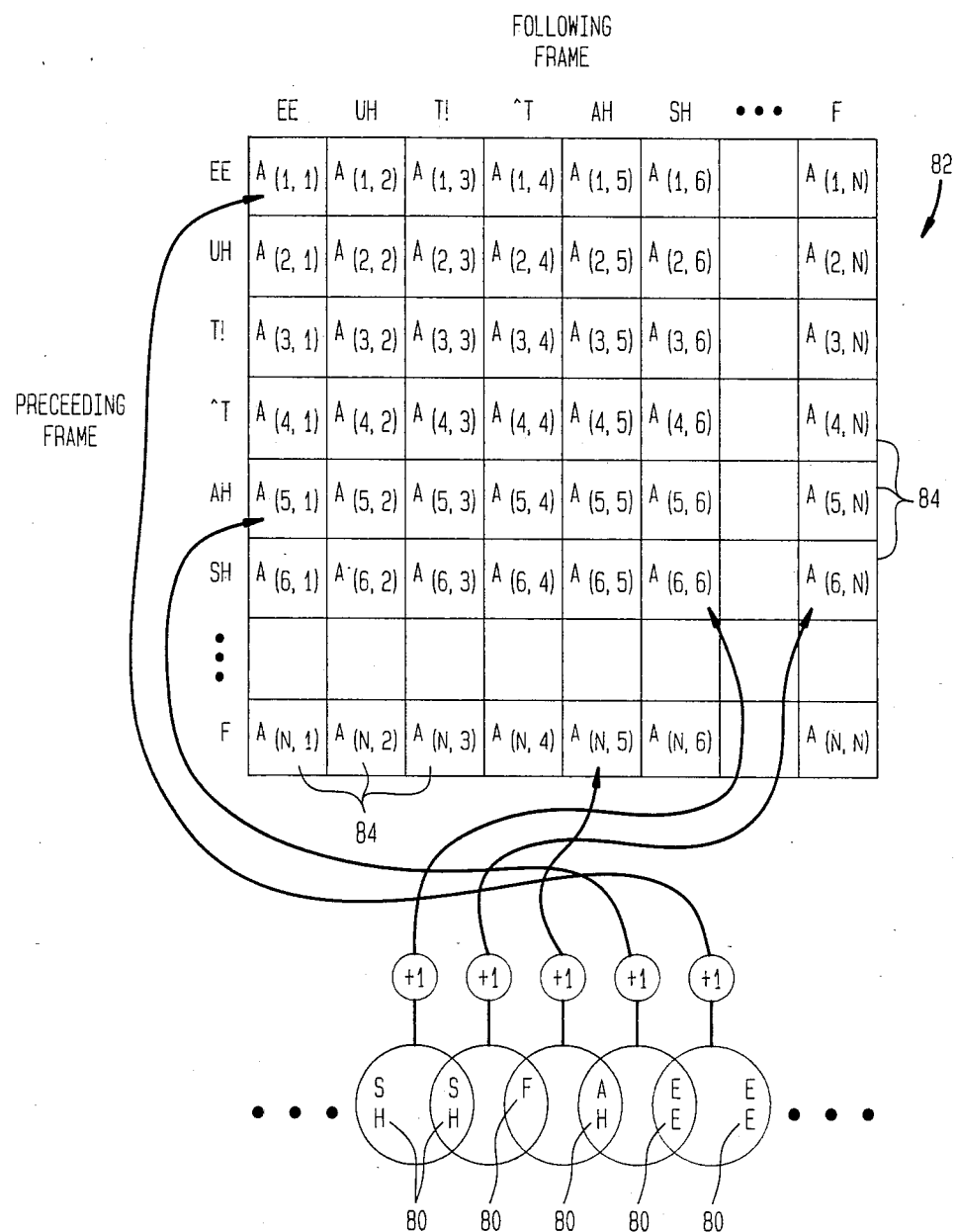
FIG. 5 is a schematic representation of a method by which a preferred embodiment of the present invention derives a matrix of transition probabilities which indicates the probability that a frame with one phonetic label will neighbor a frame with another phonetic label.

Referring to FIG. 5, once a phonetic label 80 has been associated with each of the frames 62 of the sample speech, the resulting sequence of phonetic labels is used to derive a matrix 82 of transition probabilities 84. According to the preferred embodiment of the invention, a computer creates an initially empty matrix 82 which associates both a row and a column with each of the forty-four phonetic frame labels. Then the computer progresses through the sequence of frame labels 80 which have been associated with the body of sample speech. For each label 80 in that series, it finds the following label; and for each such pair of labels, it increments the value of the entry 84 located in the row marked by the first of those labels and in the column marked by the second of those labels. For example, the first such pair of labels shown in FIG. 5 is the pair "sh-sh." As a result of this pair the value A(6,6) at the intersection of the row "sh" and the column "sh" is incremented. Then the process advances one label further down the sequence of labels to find the next pair of labels, which is the pair "sh-f." This pair causes the element A(6,n) to be incremented by 1, since it is the entry whose preceding, or row, label is "sh" and whose following, or column, label is "f." After this process has been repeated for all of the frame labels from the utterances of many words, the values in the transition probability matrix will tend to give a relatively good indication of which phonetic labels are likely to follow which phonetic labels. As is indicated in FIG. 5, the transition matrix indicates the probability that a given frame label will be followed by itself, as well as by other frame labels.

In the embodiment of the invention tested by the inventor, the transition matrix was constructed by observing the sequence of phonetic labels associated with the utterance of approximately 500 words. It should be understood, however, that even better transition matrices can be produced by observing the transition probability in a larger body of speech.

Referring now to FIGS. 6-11, once a matrix 82 of transition probabilities has been derived and stored, it is now possible to perform smooth frame labeling. Smoothed frame labeling associates a phonetic frame label 70 with each frame 62 of the speech to be labeled as a function of: (A) the closeness with which the given frame compares to each of a plurality of the acoustic phonetic frame models, (B) an indication of which one or more of the phonetic frame models most probably correspond with the frames which precede and follow the given frame, and (C) the transition probability 84 which indicate for the phonetic models associated with those neighboring frames which phonetic models are most likely associated with the given frame.

In the preferred embodiment, the technique which determine what phonetic label should be associated with each frame uses what is known in the statistical arts as hidden Markov modeling. This process finds the probability that each phonetic label $P_t$ is associated with a given observed frame F at the frame time t by the following formula:

$$\text{alpha}(t,P_t) = \text{Max}_{P_{t-1}}[\text{alpha}(t-1,P_{t-1})A(P_{t-1},P_t)\cdot\text{Prob}(F_t|P_t)] \qquad \text{Eq. (1)}$$

where
- alpha($t,P_t$) is the probability that frame t will have a the phonetic label $P_t$, where this alpha is calculated separately for each possible phonetic label;
- $\text{Max}_{P_{t-1}}$[expression] is the maximum value of the following expression over all possible phonetic labels $P_{t-1}$ associated with the previous frame $t-1$;
- alpha($t-1,P_{t-1}$) is the probability that the frame at time $t-1$ had a given phonetic label $P_{t-1}$;
- $A(P_{t-1},P_t)$ is the transition probability 84 between a given phonetic label $P_{t-1}$ for the last frame and the phonetic label $P_t$ whose probability is being calculated for the current frame; and
- $\text{Prob}(F_t|P_t)$ is the likelihood that the frame $F_t$ which is observed at time t would belongs to the class of sounds represented by the phonetic model associated with the phonetic label $P_t$.

Stated another way, Eq. 1 says that the probability alpha($t,P_t$) that the frame $F_t$ observed at time t has a given phonetic label $P_t$ is equal to the acoustic likelihood $P(F_t|P_t)$ that the frame $F_t$ belongs to the class of sounds represented by that given phonetic label times the probability of the most probable transition path from all possible phonetic labels for the former frame $F_{t-1}$ to the current frame, if the current frame has that given label $P_t$. The probability of the transition path from the former frame at time $t-1$ is calculated, for each possible label for that prior frame, by multiplying the probability alpha($t-1,P_{t-1}$) that the former frame had that label by the transition probability $A(P_{t-1},P_t)$ that a frame having that prior label would be followed by a frame having the label $P_t$ which is being considered for the current frame. The transition path having the maximum value over all possible values $P_{t-1}$ for the former frame is selected, and is multiplied by the acoustic likelihood probability.

Eq. (1) follows from the following formula:

$$\text{alpha}(t,P_t) = \text{Max}_{P_1\ldots P_{t-1}}[\text{Prob}(P_t,P_1\ldots P_{t-1},F_1\ldots F_t)] \qquad \text{Eq. (2)}$$

where
- $\text{Max}_{P_1}\ldots P_{t-1}$[expression] is the maximum value of the expression that follows it over all possible sequences of phonetic label from the first frame $F_1$ in the sequence to the frame $F_{t-1}$, which is immediately before the current frame; and
- $\text{Prob}(P_t,P_1\ldots P_{t-1},F_1\ldots F_t)$ is the joint probability that the current frame has the label $P_t$, that the sequence of frames from the first frame to the frame immediately before the current frame has a given sequence of phonetic labels $P_1\ldots P_{t-1}$, and that the sequence of frame times from the first frame period to the current frame period has the sequence of frames which have actually been observed $F_1\ldots F_t$.

As those knowledgeable in stochastic modeling are aware, a simplifying assumption called the Markov assumption greatly reduces the amount of computation required to solve an equation such as Eq. (2). Applied to Eq. (2), this assumption states that the probability that a given phonetic label is associated with a given frame can be treated as being independent of the labels associated with all other frames except those which immediately precede and follow the given frame. Although this assumption is not entirely accurate, it results in a tremendous computational savings and yields result which have normally quite good. The Markov assumption enables Eq. (2) to be stated in the following form:

$$\text{alpha}(t, P_t) = \text{Max}_{P_1 \ldots P_{t-1}}[\text{Product}_{S=1 \text{ to } t}[A(P_{S-1}, P_S) \text{ Prob}(F_S | P_S)]] \quad \text{Eq. (3)}$$

where

S is a frame time that is varied from time 1 to time t

Product$_{S=1 \text{ to } t}$[expression] means that the value in the following expression is evaluated for each frame time from frame 1 to frame t, and all of the resulting values of the formula are multiplied together $A(P_{S-1}, P_S)$ is the transition probability between the phonetic label of a given frame at time S−1 and that of its following frame at time S; and Prob$(F_S | P_S)$] is the acoustic likelihood that the frame observed at a given time S corresponds to the given phonetic label $P_S$.

Eq. (1) is equivalent to Eq. (3) because the alpha$(t-1, P_{t-1})$ which appears in Eq. (1) corresponds to $$\text{Max}_{P_1 \ldots P_{t-2}}[\text{Product}_{S=1 \text{ to } t-1}[A(P_{S-1}, P_S) \text{ Prob}(F_S | P_S)]] \quad \text{Eq. (3)}$$

FIGS. 6–11 illustrate how the preferred embodiment of the invention uses Eq. (1) to label frames. Please note that in Equations (1) through (3) above "$P_t$" means the phonetic label associated with the frame t. In the discussion of FIGS. 6–11, below, when it is necessary to identify the particular phonetic label or model being considered in association with a given frame, the number "X" of that phonetic label or model will be placed directly after the letter "P" in the form "PX". Thus "P1$_t$" means that the first phonetic frame models is being considered in association with the frame t. If it is clear from the context of the discussion which frame time is being discussed, the subscript will normally be omitted.

Figure 6:
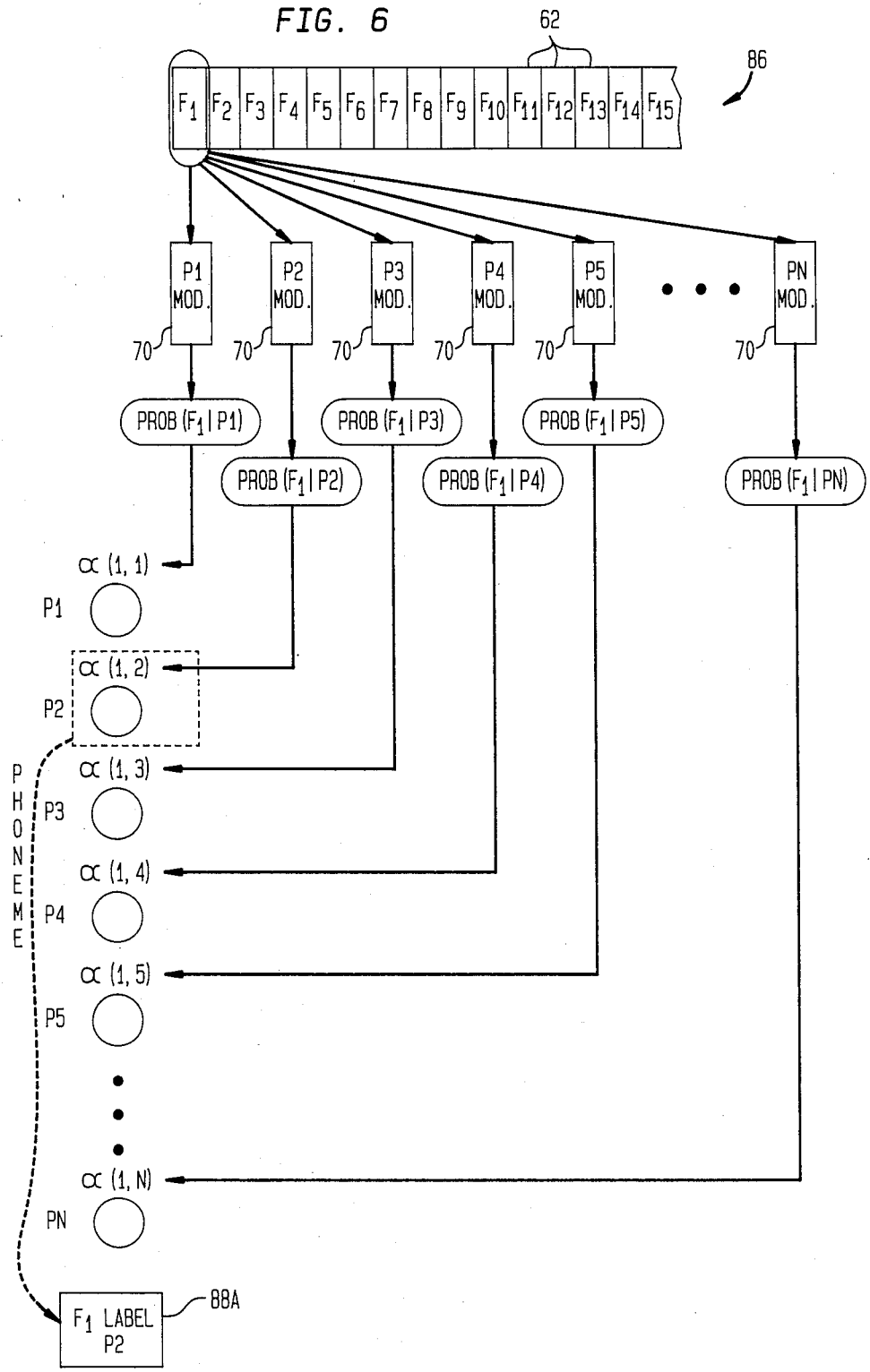
FIGS. 6-11 are schematic representations of the method by which a preferred embodiment of the present invention uses hidden Markov modeling to provide improved phonetic frame labeling.

FIG. 6 shows how the process of smoothed frame labeling starts on the first frame $F_1$ of a frame sequence 86. In this case, the Eq. (1) is reduced to $$\text{alpha}(1, P_1) = \text{PROB}(F_1 | P_1) \quad \text{Eq. (4)}$$

since there is no prior frame at time t−1 and therefore no alpha$(t-1, P_{t-1})$ or transition probability $A(P_{t-1}, P_t)$. Thus, for the first frame, $F_1$, the alpha calculated for each possible phonetic label is determined solely by the likelihood Prob$(F_1 | PX_1)$, which is calculated by comparing the frame $F_1$ the phonetic label PX. This is done for each of the phonetic models PX, from P1 through PN, which represent the forty-four phonetic frame labels shown in Table 1. Once an alpha has been calculated for each of the phonetic labels in the first frame $F_1$, the phonetic label with the best scoring alpha for that frame is stored in a best-label variable 88A, which is associated with the first frame. In the example of FIG. 6 it is assumed that the alpha(1,2) has the best probability score, and thus its corresponding phonetic label P2 is placed in the variable 88A.

Figure 7:
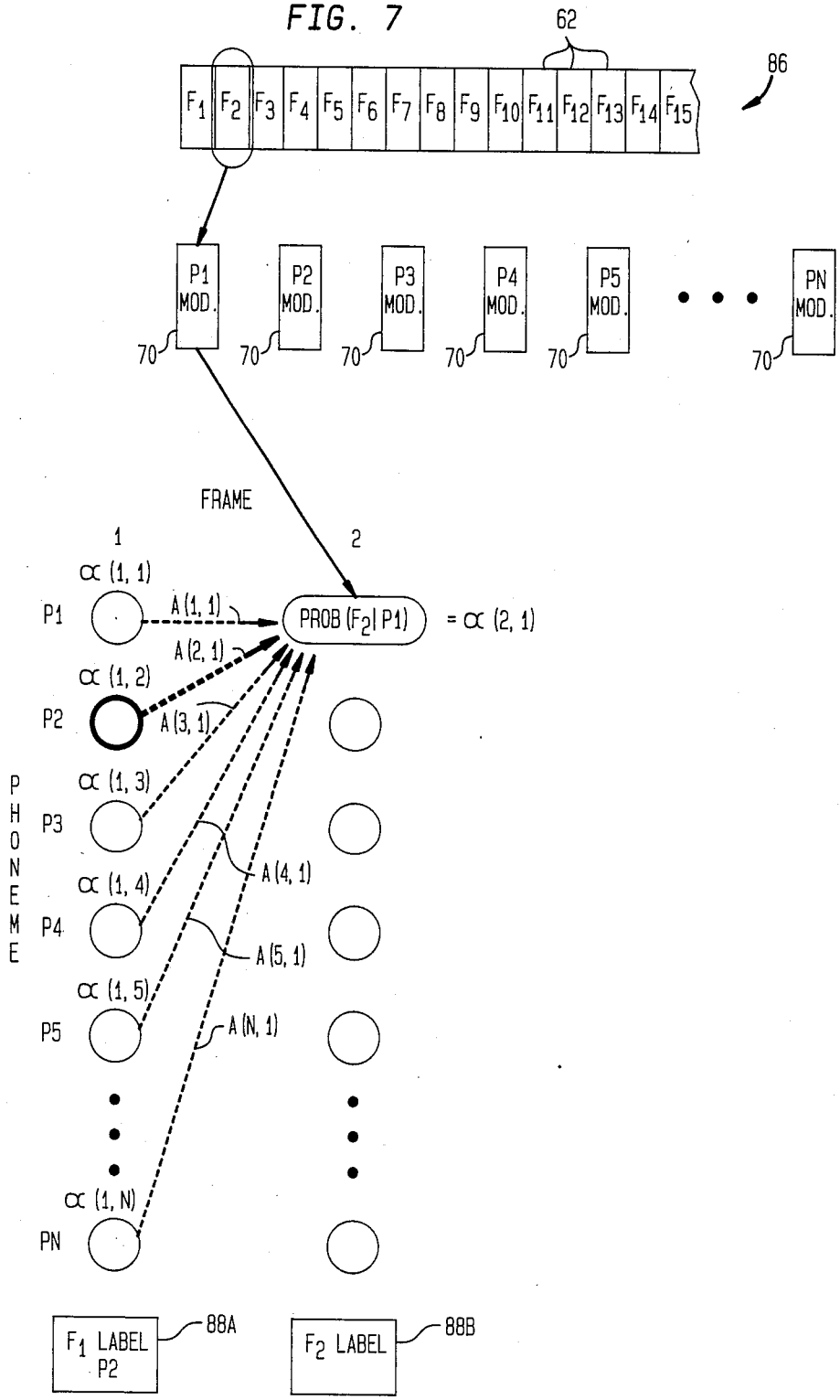

Once all the alphas have been calculated the first frame, the method of the present invention starts to calculate alphas for the second frame, $F_2$, as is indicated in FIG. 7. According to Eq. 1, this method determines alpha(2,1), the probability that the second frame is associated with the first phonetic label P1, by multiplying the acoustic likelihood PROB$(F_2 | P1)$ by the probability of the highest probability transition path from the previous frame. As is indicated in Eq. 1, the probabilities of each of these transition paths is determined by multiplying the alpha for each phonetic label in the previous frame, frame 1, by the transition probability between that prior phonetic label and the phonetic label P1 for which the current alpha(2,1) is being calculated. In the example of FIG. 7 it is assumed that the transition path from the alpha(1,2), that shown in bold lines, is the best scoring transition path. This probability of that transition path is alpha(1,2) multiplied by the transition probability A(2,1). That transition path probability is then multiplied by the acoustic likelihood, as indicated in FIG. 7, to produce alpha(2,1).

Figure 8:
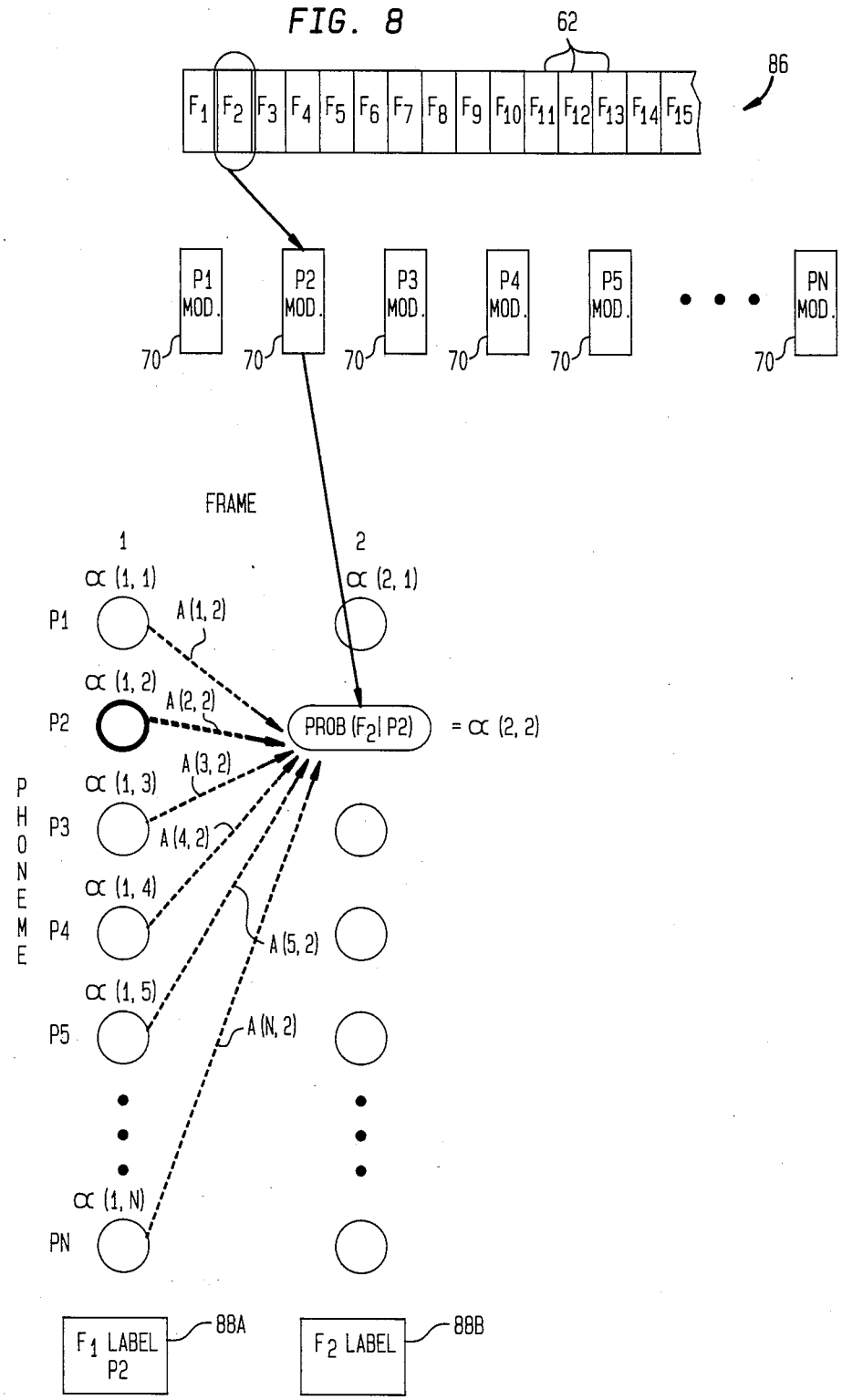

FIG. 8 shows that the same process is used to calculate alpha(2,2), which indicates the probability that the second frame is associated with the second phonetic frame model P2. This process calculates the acoustic likelihood PROB$(F_2 | P2)$ by comparing the second frame with the second phonetic model. This likelihood value is then multiplied by the probability of the single most probable transition path leading from all the possible phonetic frame models associated with the previous frame, $F_1$. In the example shown in FIG. 8, it is assumed that this best scoring transition path is that produced by the product of alpha(1,2) and A(2,2), as is shown in bold lines.

Figure 9:
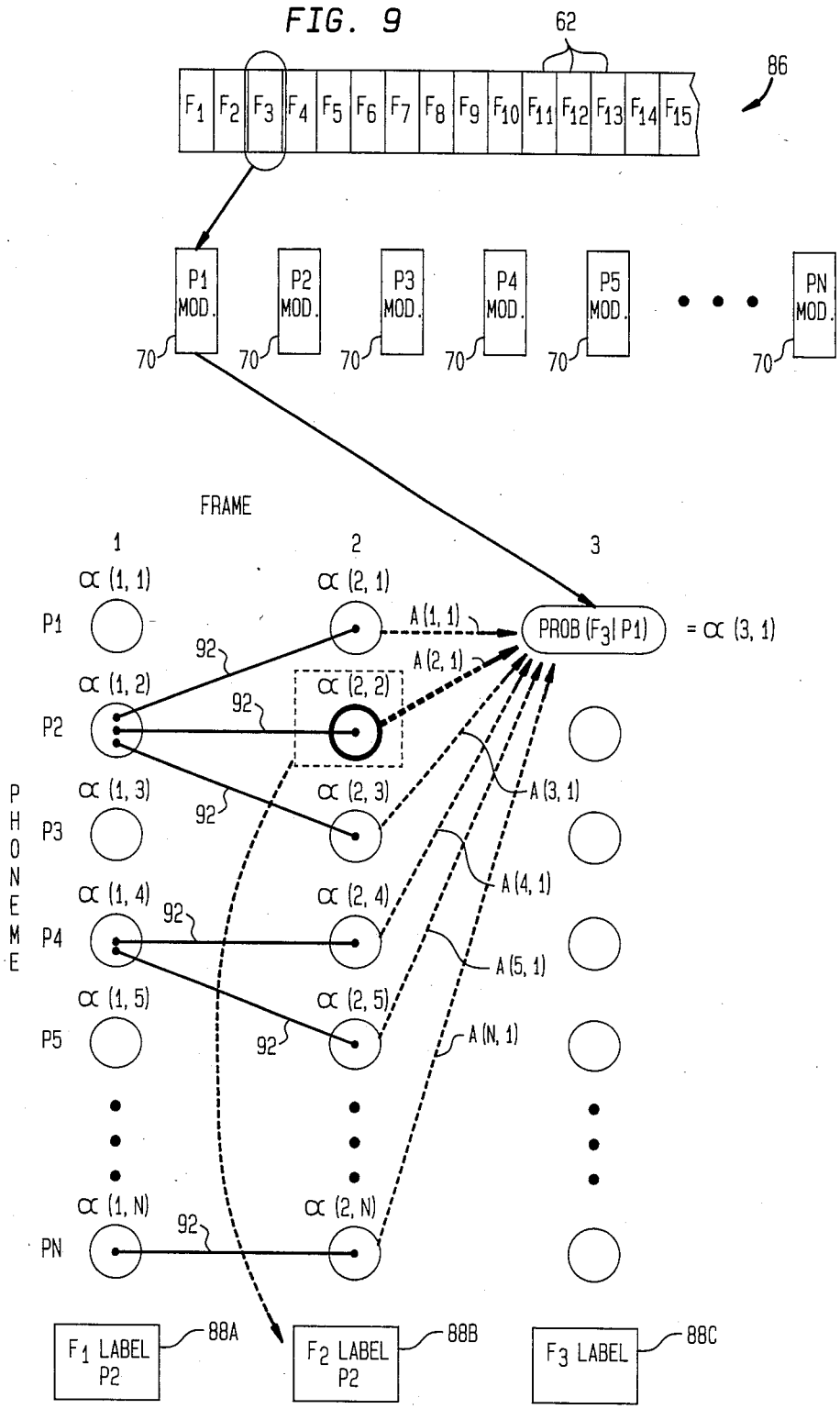

Referring now to FIG. 9, this process of calculating an alpha for the second frame is repeated for each of the remaining phonetic models P3 through PN, using a similar process of multiplying the acoustic likelihood that the second frame matches each such model times the most probable transition path to that model from all possible phonetic labels for the previous frame. Once a complete set of alphas has been calculated for the second frame, the best scoring of them has its associated phonetic label stored in the best-label variable 88B for the second frame. In the example of FIG. 9, alpha(2,2) has the highest probability at this point, and thus the phonetic model P2 is placed in the best-label variable 88B.

The alphas which represent the probability that each of the phonetic labels P1 through PN is associated with the third frame are calculated by the same method as the alphas for the second frame. For each phonetic model PX, from P1 through PN, this method calculates the acoustic likelihood Prob$(F_3 | PX)$ of the match between the frame $F_3$ and the phonetic model PX, and then multiples that likelihood by the probability of the most probable transition path to that model from the second frame. The probability of the transition path from each possible phonetic model PY, from P1 through PN, associated with the second frame is calculated by multiplying the alpha$(2, PY_2)$ previously calculated for the phonetic model PY at the second frame, times the transition probability A(PY,PX). FIG. 9 shows such a calculation being made for the probability that the first phonetic model P1 corresponds to the third frame $F_3$. In the example of FIG. 9, it is assumed that the best scoring transition path from the second frame is that shown in bold lines, which leads from the previously best scoring alpha, alpha(2,2).

Figure 10:
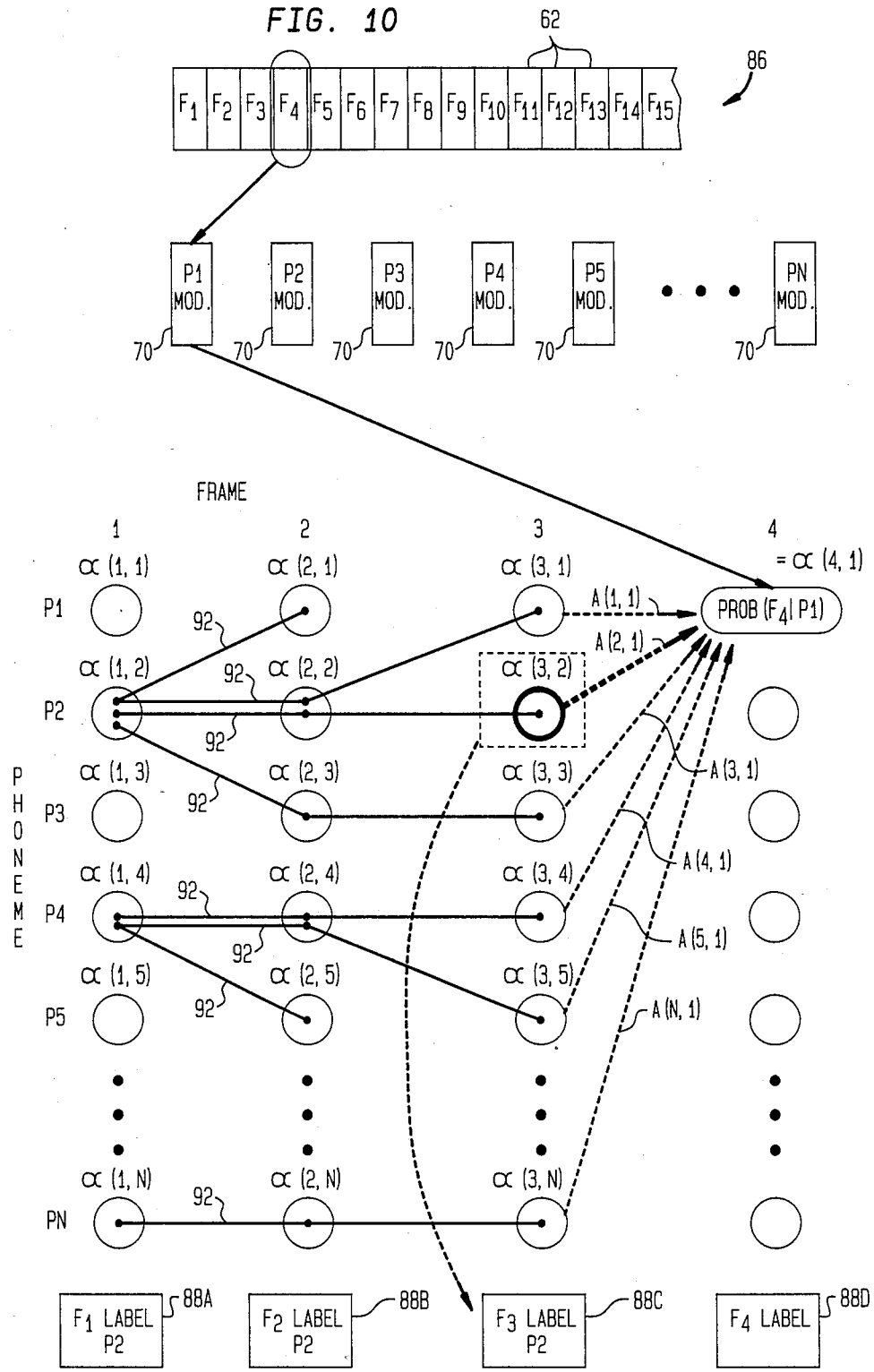

Referring now to FIG. 10, after a complete set of alphas has been calculated for the third frame, the best scoring alpha for that frame has its associated phonetic label inserted into the best-label variable 88C for the third frame. In the example of FIG. 10 this best scoring alpha is alpha(3,2), and thus its corresponding phonetic label, P2, is placed in the variable 88C.

Once all the alphas have been calculated for the third frame, the process is repeated for the fourth frame. This process compares the fourth frame $F_4$ against each of the phonetic models P1 through PN and multiplies each of the resultant likelihood scores by the probability of the best scoring transition path leading to it from the third frame. In FIG. 10, this process is shown being performed for alpha(4,1), which indicates the probability that the first phonetic label P1 corresponds to the fourth frame. In the example of FIG. 10 the transition path from alpha(3,2), that shown in bold lines, is the best scoring one in the calculation of alpha(4,1).

Figure 11:
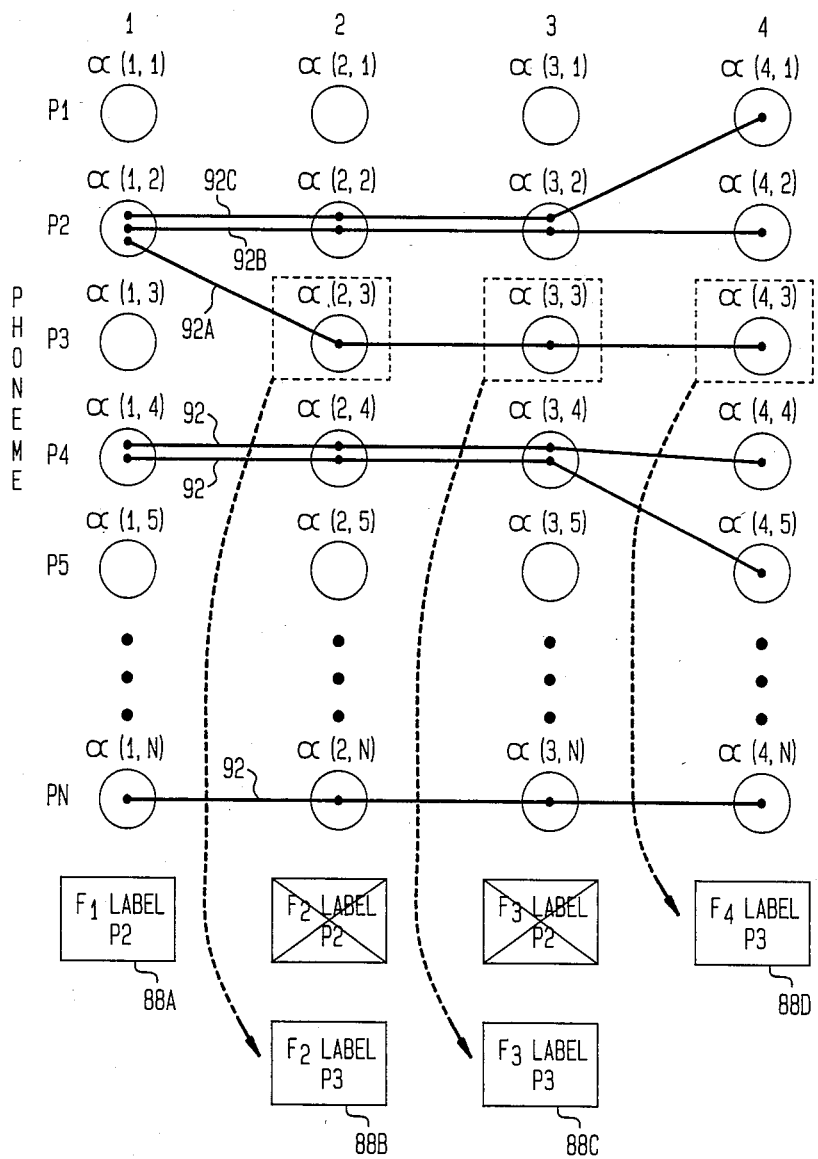

FIG. 11 shows the matrix of alphas produced for the first four frames of the speech 86 by the method described above. In the example of FIG. 11, the best scoring alpha for the fourth frame is alpha(4,3), as is indicated by the fact that its associated phonetic label P3 is placed in the best-label variable 88D for the fourth frame. As is indicated in FIGS. 9-11, when each alpha is calculated, a record is kept of the path 92 which has lead to that alpha for up to the last 10 frames. In the example of FIGS. 6-11, the paths, or sequences of label, 92B and 92C which associate the second phonetic lable P2 with the first, second, and third frames both appear to be the most probable sequences of labels up until the fourth frame. But the example assumes that alpha(4,3) is the best scoring alpha for the fourth frame, causing the associated phonetic label P3 to be placed in the best-label variable 88D. It is also assumed that the most probable transition path leading to the label P3 in the fourth frame is the one from alpha(3,3), which associated the third phonetic label with the third frame. Similarly it is assumed that the most probable transition path leading to alpha(3,3) is from alpha(2,3), and that the most probable transition path leading to alpha(2,3) is that leading from alpha(1,2), all as is indicated by the path 92A. Thus path 92A associates the second label P2 with the first frame and the third phonetic label P3 with the second, third and fourth frames.

Every time the best scoring alpha is chosen for a given frame the method checks to determine whether the most probable transition path from the previous frame used to calculate the current best scoring alpha came from the alpha associated with the best-label variable for the previous frame. If not, the process replaces the best-label variable for the previous frame with the label associated with the alpha of the previous frame which is on the most probable transition path to the best scoring alpha of the current frame. As is indicated in FIG. 11, this process of replacing the phonetic labels stored in the best-label variables with the phonetic labels associated with the current optimal path 92A leading to current best scoring alpha, alpha(4,3) is continued until the first frame for which the best-label variable matches the corresponding phonetic label on the current optimal path 92A. This process of backtracking is repeated for up to ten frames, since, as is stated above, the preferred embodiment only stores the paths leading to each alpha for the last ten frames. Usually, ten frames is more than enough, since the inventor's experience indicates that differences between the values in the best-label variables and the current optimal path 92 seldom extend back more than several frames.

It should be appreciated that the preferred embodiments use of backtracking to correct phonetic labels stored in the best-label variables 88, causes its smoothed frame labeling to take into account the probability of transition paths to the following frame, as well as the probability of transition paths from the previous frame, when labeling a given frame.

The initial pass of the smoothed frame labeling process just described uses an initial transition matrix 82 derived as shown in FIGS. 4 and 5. Since this initial transition matrix is derived from speech which is labeled without smoothed frame labeling, it tends to be less accurate than desired. This inaccuracy results because the frame labeling shown in FIG. 4 is less accurate than smoothed frame labeling, and thus is less likely to produce accurate transition probabilities. According to the preferred embodiment of the present invention, once the initial pass of smoothed frame labeling has labeled a sample body of speech, the sequence of labeled frames produced by that first path are used to derive a new, improved, transition matrix 82 using the method described above with regard to FIG. 5. After this is done, the smoothed frame labeling process described in FIGS. 6-11 is repeated upon the sample speech, using the new transition probabilities. This process of using smoothed frame labeling to re-label the sample speech and then calculating a new transition matrix from the re-labeled speech is reiterated several times until the transition matrix 82 approaches a relatively optimal value. Once this is done, the smoothed frame labeling is ready for use as part of the speech recognition method of the preferred embodiment of the present invention.

Figure 12:
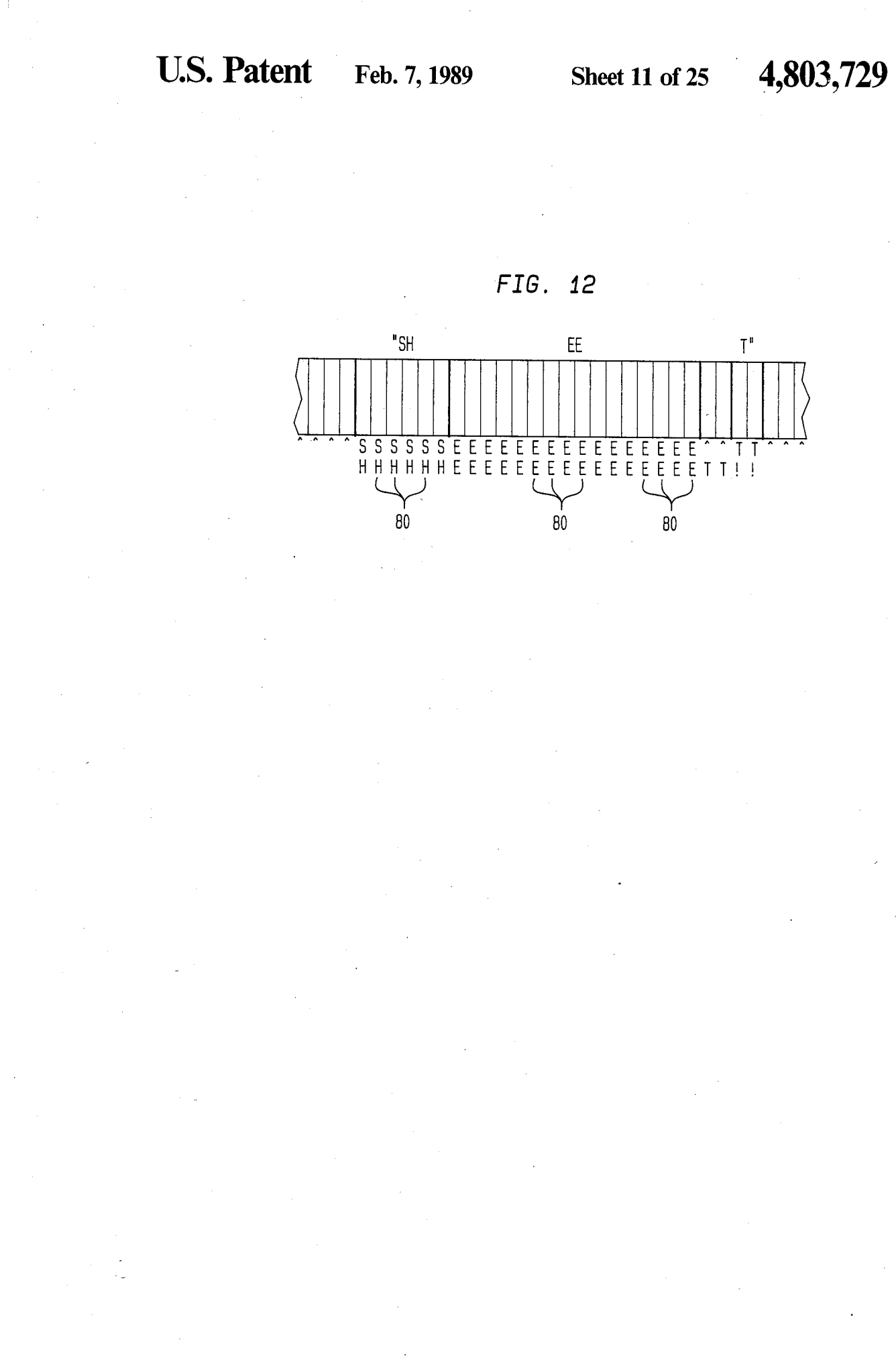

Referring now to FIG. 12, once the transition matrix has been properly trained, it will indicate that, for most phonetic labels, a frame with a given label will have the greatest probability of being followed by another frame with that same label. This results because most phonetic sounds last for a plurality of frames, as is indicated in FIG. 12, and thus most phonetic labels occur in sequence of frames which contain the same label. Since smoothed frame labeling uses such transition probabilities, it increases the chance that a given frame will be followed by itself. As a result, smoothed frame labeling greatly reduces the fluctuation in phonetic labels, shown in FIG. 4, which result from background noise and sampling errors. Instead it tends to "smooth" the labeling, that is, to make it much more consistent, as is indicated in FIG. 12.

Also, the transition probability used in smoothed labeling capture the fact that some phonetic labels are likely to occur together, whereas others are not. It uses this information in determining which phonetic labels are most likely to correspond to which frames. For example, in Table 1 the label "ohr" represents a sound of "o" which tends to result when "o" is said preceding an "r". A transition matrix 82 using such phonetic labels will tend to have a fairly high probability for the label "ohr" to be followed by an "r" label. This use of statistical information about what sounds are likely to follow what sounds improves the accuracy of smoothed frame labeling.

Referring now to FIGS. 13 through 16, before the preferred embodiment of the present invention can recognize speech, it has to have models developed for the vocabulary words it is to recognize. According to the preferred embodiment, the word models used for speech recognition are diphone-based word models. That is, they are word models which associate a diphone model 112 with each of a plurality of segment boundaries 110 normally associated with their corresponding vocabulary word. Each diphone model is composed of two boundary models, a pre-boundary model 114, which models the sound which precede its associated segment boundary 110, and a post-boundary model 116, which models the sound which follows that boundary.

Before such diphone models can be derived, one or more utterances of each vocabulary word must be broken into segments. This is done by using the smoothed frame labeling described above. This method of frame labeling is particularly suited to dividing speech into segments, since its labeling, and thus the resulting segmentation, is less likely to make mistakes because of random noise and sampling error than traditional frame labeling.

Figure 13:
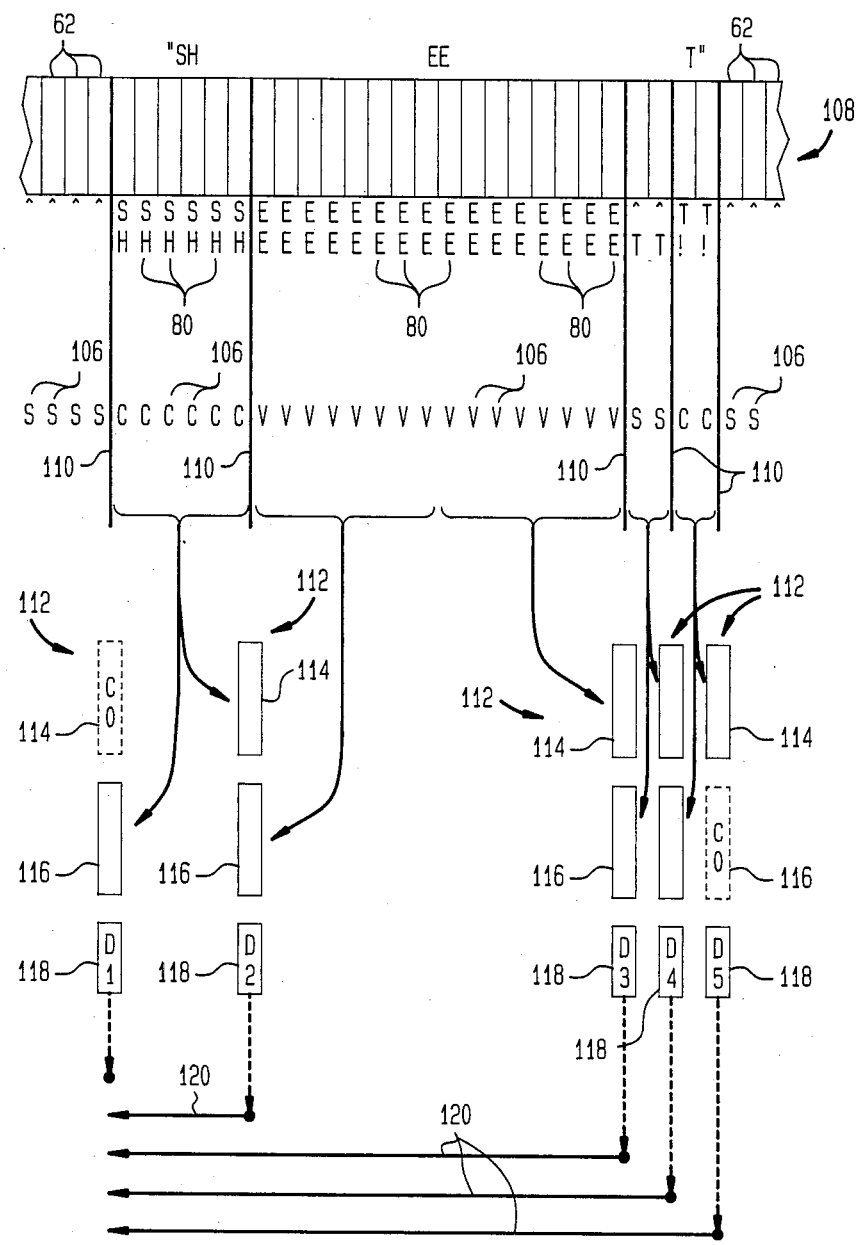
FIG. 13 is a schematic representation of the method by which a preferred embodiment of the present invention derives models of a word by taking frames produced by an utterance of that word, dividing them into segments of frames labeled with the same class of phonetic frame models, deriving an initial diphone model in association with each segment boundary, with each such initial diphone model having a pre-boundary and a post-boundary model, and deriving a temporal displacement indication which indicates the number of frames between each such initial diphone model and the beginning of the word.

According to the preferred embodiment, this segmentation is performed by associating a phonetic class label 106 with each of the forty-four phonetic labels shown in Table 1. In the embodiment of the invention built by the inventor, three phonetic class labels are used. One, indicated by the letter S in FIG. 13, represents phonetic labels associated with silence or stop pauses. The second, indicated by the letter C in FIG. 13, represents the phonetic labels associated with consonant-like sounds. The third, indicated be the letter V in FIG. 13, represents phonetic labels associated with vowel-like sounds. It should be understood, that in other embodiments of the invention, a larger number of phonetic class labels could be used.

After a segment of speech has had a phonetic label 80 associated with each of its frames by smoothed frame labeling, it has a phonetic class label 106, either S, C, or V, associated with each such frame based on the identity of its associated phonetic label. Then the phonetic class labels 106 associated with each pair of adjacent frames are compared to determine where neighboring frames have different phonetic class labels. Between frames which have different phonetic class labels, the method indicates the presence of a segment boundary 110 as is indicated in FIG. 13.

In the preferred embodiment, the diphone models 112 initially derived for each of a word's segment boundaries are referred to as "initial diphone models," since they are ultimately replaced by a diphone-type model, as is described below. The pre-boundary model 114 of each initial diphone model is calculated by taking all the frames in the segment which immediately precedes its segment boundary 110, up to eight frames from that boundary, and separately averaging for each parameter of those frames all the values for that parameter. Thus each pre-boundary model has the same number of parameters as the frames from which it is formed, and the value of each such parameter is an average over those frames. The post-boundary model 116 associated with each initial diphone model is calculated in a similar manner from the frames in the segment which immediately follow its associated boundary 110, up to eight frames after that boundary. In addition, a temporal displacement indication 118 is associated with each initial diphone model, indicating the temporal distance, in terms of frames, between the initial diphone model's associated segment boundary and the first segment boundary of its word, as is indicated by the arrows 120 shown in FIG. 13.

In the embodiment of the invention tested by the inventor, a diphone-based word model is created for each vocabulary word from just one utterance of that word by a particular speaker which the system is being trained to recognize. In other embodiments of the invention, however, diphone-based word models could be derived from multiple utterances of each vocabulary word. This would tend to improve the word models by making them more representative of the different ways in which each vocabulary word is spoken.

Figure 14:
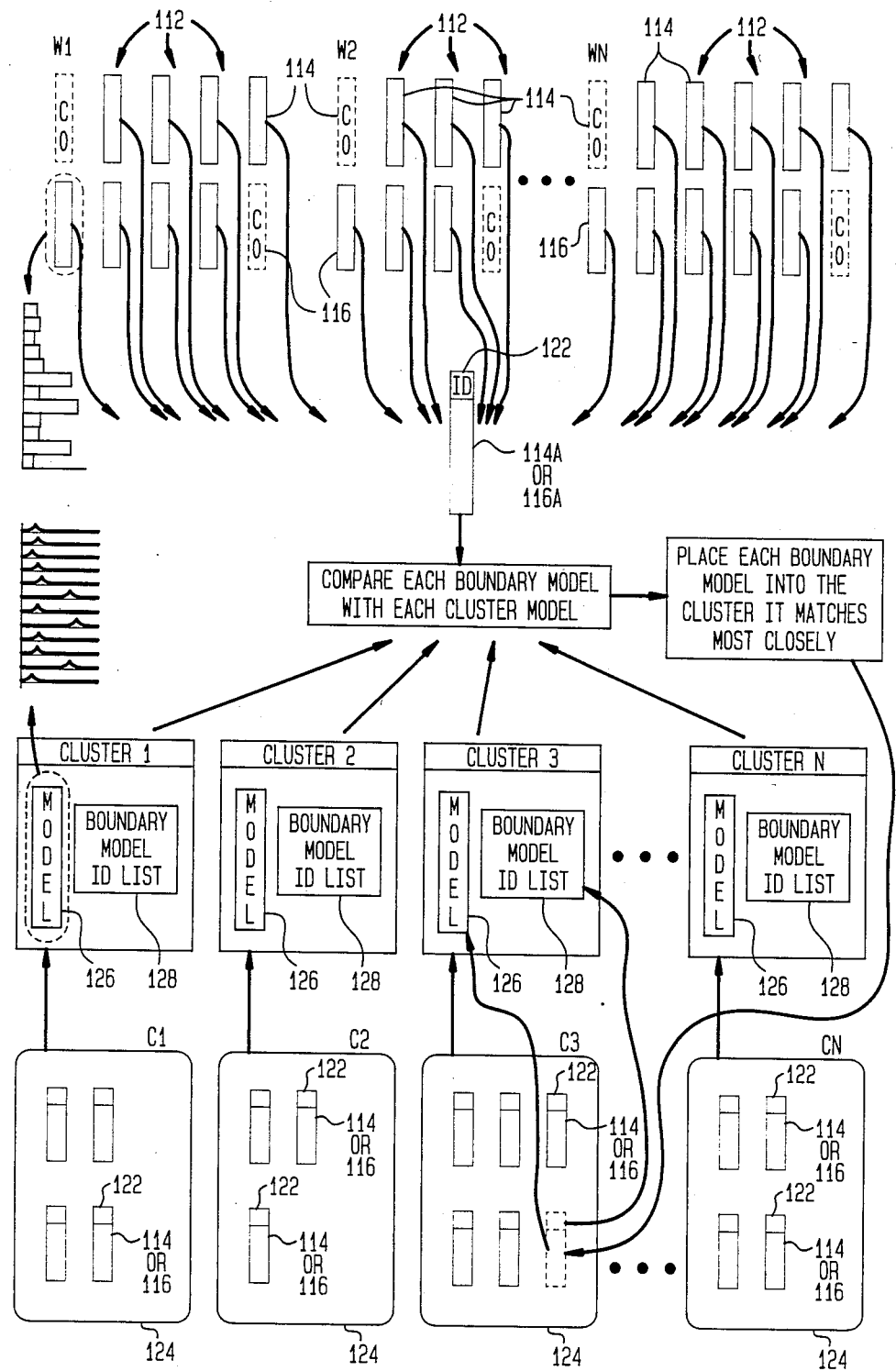
FIG. 14 is a schematic representation of the method by which a preferred embodiment of the present invention takes boundary models from the initial diphone models of a plurality of vocabulary words and divides them into clusters of relatively similar boundary models.

Referring now to FIG. 14, once a collection of initial diphone models 112 and their associated temporal displacement indications 118 have been calculated for each vocabulary word, all of the pre-boundary models 114 and post-boundary models 116 for all such vocabulary words are clustered. That is, they are divided into groups, or clusters, of relatively similar boundary models. The process of clustering models is well known in the statistical arts and is explained in great detail in Application Ser. No. 862,275. Stated briefly, this process takes each boundary model 114 or 116, and associates with it an initial boundary model ID 122. Each such ID indicated the word, the boundary number, and the diphone part (i.e., whether it is a pre- or post-boundary model) from which the boundary model came. Then each such boundary model 114A or 116A is compared with each cluster 124 to determine which contains models which are most like it. This done by comparing each boundary model with a plurality of cluster models 126, each of which statistically represents the boundary models placed within its associated cluster. If the distance between a boundary model and one of the cluster models is less than a certain clustering threshold distance, the boundary model is placed in the cluster 124 associated with its closest cluster model 126. If the given boundary model is not within the clustering threshold distance of any previously calculated cluster model, it is placed in its own cluster, against which other boundary models can be compared. FIG. 14 schematically represents this process by showing the boundary models 114A or 116A being copied into in clusters 124, each of which is composed of a plurality of other boundary models 114 or 116. In actuality the boundary models are not really copied into each cluster. Instead, when a boundary model is added to a cluster 124, its value is combined into the probability distribution represented by the cluster's cluster model 126, and the boundary model's ID 122 is added to the cluster's boundary model ID list 128. The cluster model 126 is a probability distribution having the same form as the phonetic frame models 70. This is, it is a Laplacian probability distribution with a separate dimension, each with a separate mu, or average, and a separate sigma, or absolute deviation, for each of the parameters of the boundaries models 114 and 116. The boundary model ID list 128 identifies the origin of all the boundary models which have been associated with its cluster.

As is well known in the art of clustering, and is described in Application Ser. No. 862,275, the process of clustering is performed in an iterative fashion to achieve a relatively optimal division of the models being clustered into groups of similar models. As is also known, the number of clusters which result from a clustering process can be varied by altering the clustering threshold distance which is used to determine if a model being clustered should be placed in a previously formed cluster, or in its own separate cluster. In the preferred embodiment, the clustering threshold distance is set so that approximately 400 boundary model clusters 124 are created by the clustering process.

Figure 15:
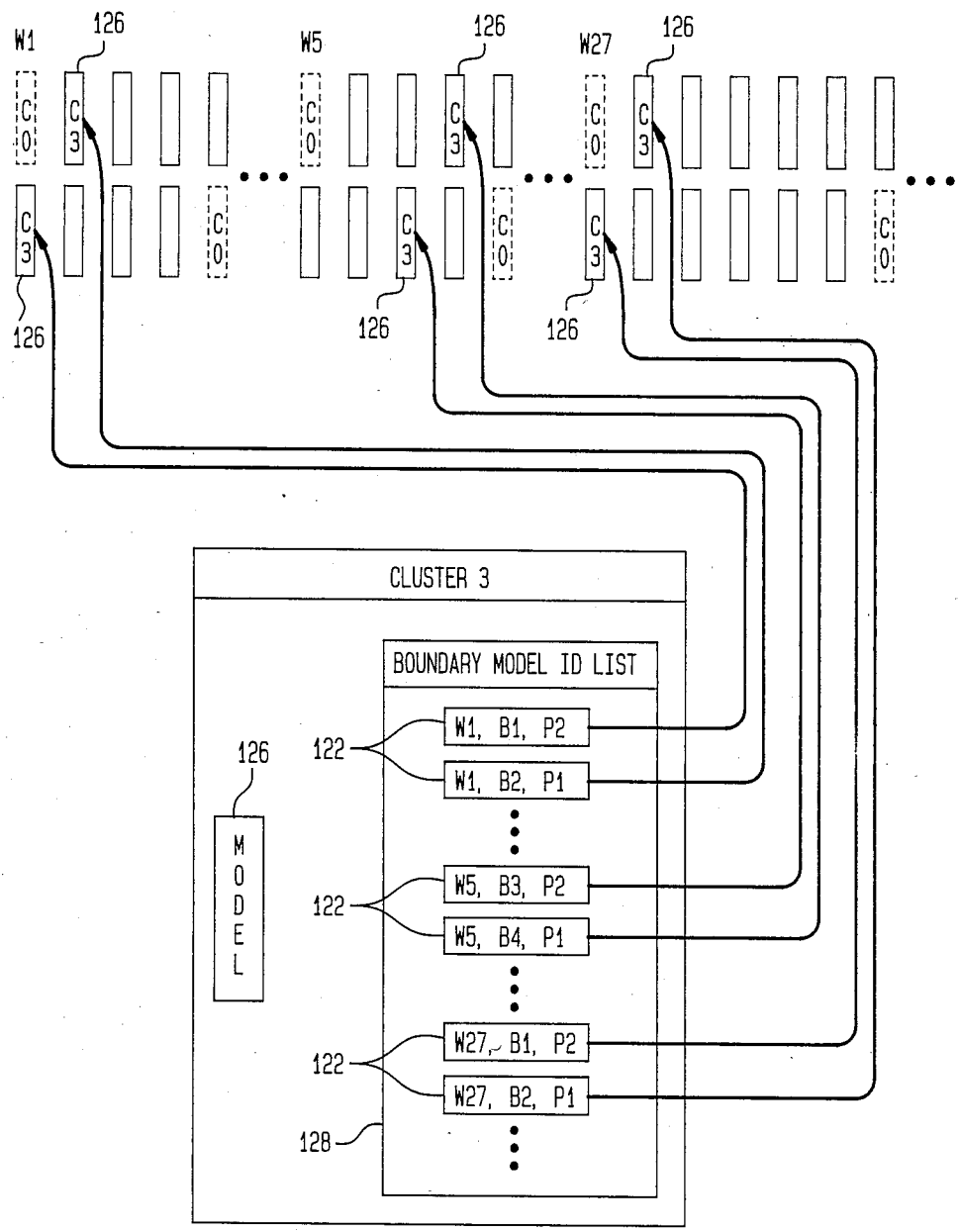
FIG. 15 is a schematic representation of the method by which a preferred embodiment of the present invention associates with each boundary model of each vocabulary word the cluster into which that boundary model has been placed by the clustering process of FIG. 14.

Referring now to FIG. 15, once the clustering process has been completed, the preferred embodiment associates with each boundary model 114 or 116 of each vocabulary word the particular cluster into which that given boundary model has been placed. As is shown in FIG. 15, this is performed by taking the boundary model ID list associated with each cluster and associating with each of the boundary models identified in that list the cluster model 126 of that cluster. For example, FIG. 15 shows the boundary model ID list 128 of the third cluster. The first ID 122 in that list indicates that the boundary model of the second, or post-boundary, part of the first diphone model of the first vocabulary word, was placed in the third cluster. Thus the cluster model C3 associated with the third cluster is associated with the post-boundary model of the first diphone model of the first vocabulary word W1. This process of associating a cluster model 126 with each boundary model is repeated for each boundary model identified in the boundary model ID list of each cluster.

In deriving the word models, utterance detection techniques, which are well known in the speech recognition art, are used to detect the beginning and end of each separately spoken training utterance of a vocabulary word. The diphone models associated with the beginning and end of each such utterance are detected, and the pre-boundary model of the first diphone model, and the post-boundary model of the last diphone model, of each word are associated with an empty cluster, C0. The empty cluster indicates that, for purposes of speech recognition, its associated boundary models are considered to match all other cluster models with equal probability. The first pre-boundary model and the last post-boundary model of each vocabulary word are associated with the empty cluster because their positions correspond to whatever sounds occur immediately before or immediately after their associated word.

Figure 16:
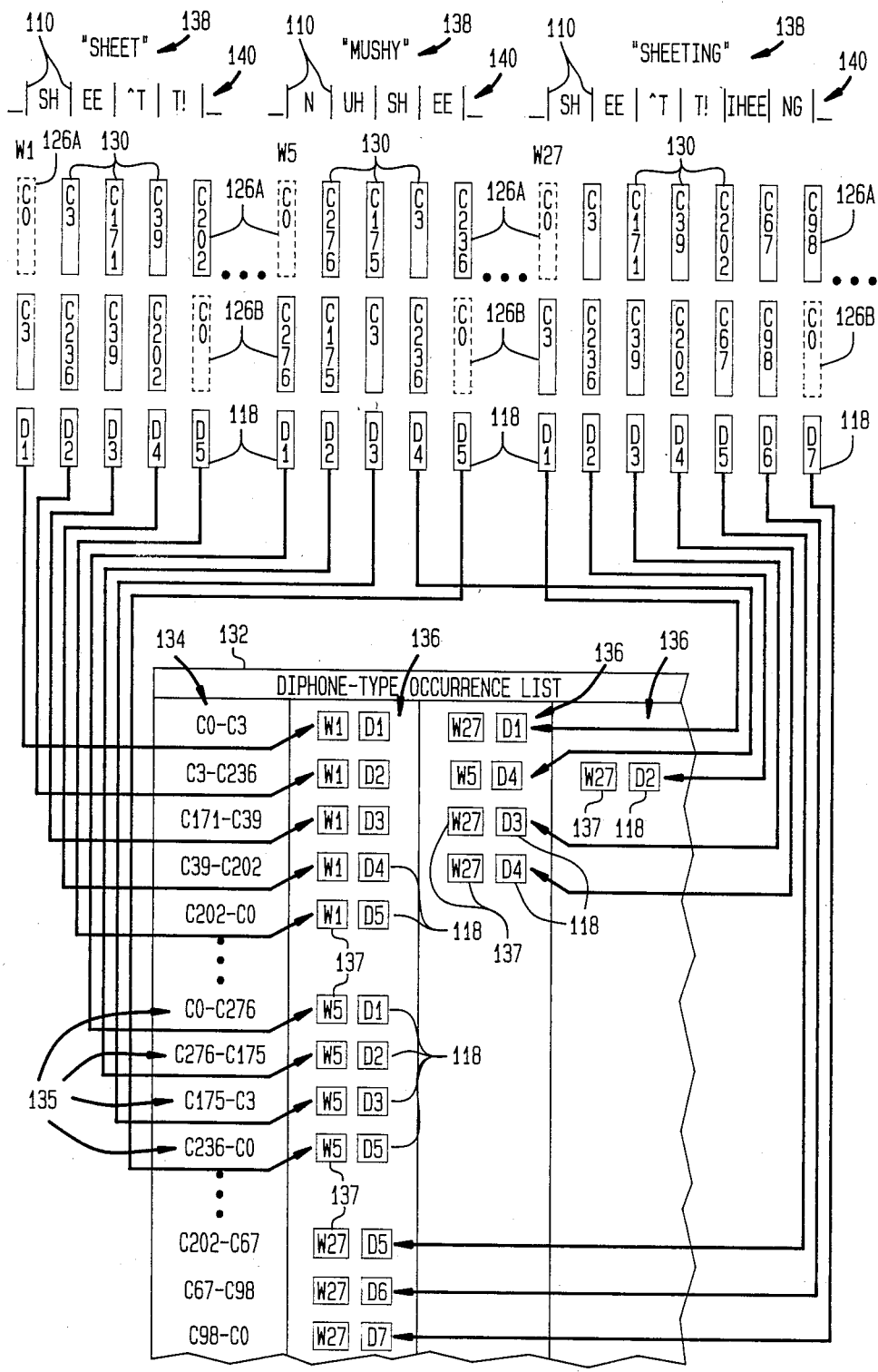
FIG. 16 is a schematic representation of the method by which a preferred embodiment of the present invention creates a diphone-type occurrence list that lists for each diphone-type, that is, for each pair of boundary model clusters associated with one or more initial diphone models, each word in which that diphone-type occurs and the temporal displacement indication associated with each such diphone-type occurrence.

Referring now to FIG. 16, once the process shown in FIG. 15 has been completed for the boundary model ID lists of all clusters, each of the vocabulary words will have a cluster model 126A associated with each of the pre-boundary models, and a cluster model 126B associated with each of the post-boundary models, of each of its initial diphone models. This is indicated in FIG. 16 for three vocabulary words chosen as examples. These words are W1, the word "sheet"; W5, the word "mushy"; and W27, the word "sheeting." The combination of the pre-boundary cluster model 126A and post-boundary cluster model 126B associated with each initial diphone model 112 shown in FIG. 14 creates a new diphone model, called a diphone-type model 130, which replaces that initial diphone model.

Once all the vocabulary words have two cluster models associated with each of their diphone models, a diphone-type occurrence list 132 is created. This is done by comparing the combination of the pre-boundary cluster model 126A and the post-boundary cluster model 126B associated with each given diphone-type model 130 against each of the diphone-type listed in the diphone-type column 134 of the diphone-type occurrence list 132. If none of the diphone-types listed in that column contain the same combination of pre- or post-boundary cluster models as does the given diphone-type model, then the given diphone-type model's combination of cluster models is added to the end of the diphone-type column as a new diphone-type, and the number 137 of the vocabulary word from which the given diphone model comes and the temporal displacement indication 118 associated with that diphone-type model are entered in the first entry 136 in the row of list 132 associated with that new diphone-type. If, however, the combination of cluster models associated with the given diphone-type model 130 matches a diphone-type which already occurs in the list 132, then the word number 137 and temporal displacement indication 118 associated with the given diphone-type model are added as a new entry 136 at the end of the row associated with that matching diphone-type.

FIG. 16 illustrates what the diphone-type occurrence list 132 looks like after all the diphone-type models 130 from the three example words, W1, W5, and W27, have been entered in that list. In order to aid in the understanding of this figure, an English spelling 138 of each of these example words is provided, along with a description 140 of the phonetic labels from the Table 1 associated with the majority of the frames between each of its boundaries 110. In these approximate phonetic spellings 140, the label "_" is associated with the empty clusters C0. The words W1, W5, and W27 have been chosen as examples because they share common sounds, and common diphone-types. As can be seen from FIG. 16, when a diphone-type occurs in multiple words, as many of them do, the row of the diphone-type occurrence list associated with that diphone-type has multiple entries.

Once the diphone-type occurrence list 132 has an entry for all the diphone-type models 130 of all the vocabulary words which a system is to recognize, that diphone-type occurrence list, along with the acoustic cluster models 126, constitutes a diphone-based model of each vocabulary word. The list 132 constitutes such word models because it associates with each diphone-type all the words in which that diphone-type occurs along with the temporal displacement indication which indicates approximately how many frames from the beginning of each such word that diphone-type occurs.

Figure 17:
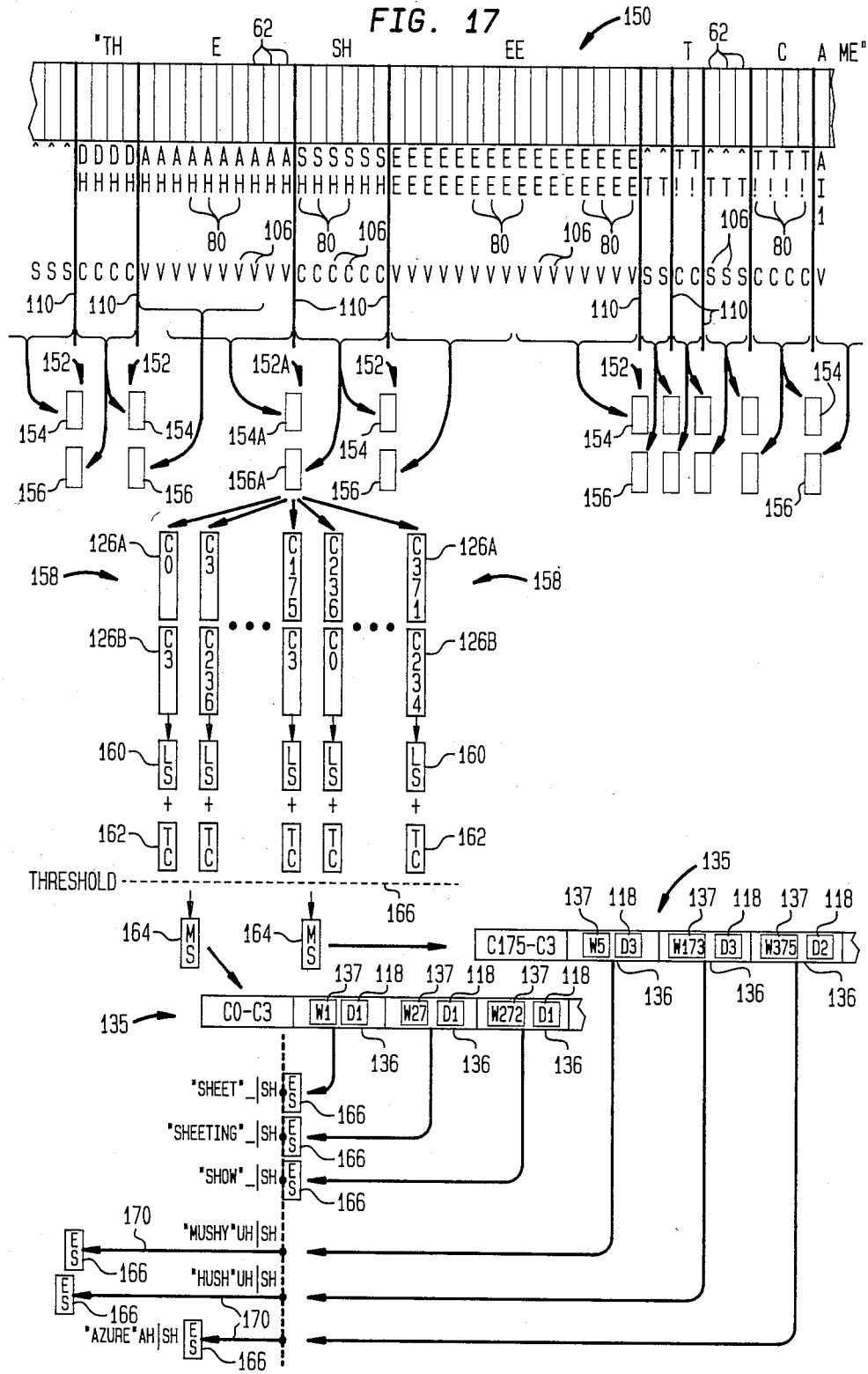
FIG. 17 is a schematic representation of part of the method by which a preferred embodiment of the present invention attempts to recognize a sequence of speech by dividing its frames into segments having the same class of labels, deriving diphone models for the boundaries between such segments, comparing each diphone model so produced with each of a plurality of diphone-types, selecting those diphone-types with which each diphone model compares most closely, producing an evidence score for the occurrence of each word associated with each selected diphone-type by the diphone-type occurrence list, and placing each such evidence score at a location in the speech displaced from its associated diphone model by the amount of its associated temporal displacement indication.

Referring now to FIG. 17, once the diphone-type occurrence list 132 has been completed, the system is ready to perform speech recognition using an embodiment of the invention's combined-displaced evidence method. In the example shown in FIG. 17, the recognition is performed upon a sequence of speech 150 which corresponds to the continuous speaking of the phrase "The sheet came." All but the tail end of this phrase is included in the frames shown in FIG. 17. The process of FIG. 17 divides the speech into segments and develops a diphone model 152, with a pre-boundary model 154 and a post-boundary model 156, for each resulting segment boundary. It does this in exactly the same manner that the process of FIG. 13 segments speech and derives initial diphone models 112. The only difference is that the process of FIG. 17 does not associated empty clusters with the pre-boundary models associated with the start of speech or post-boundary models associated with the end of speech, and it does not calculate temporal displacement indications.

Once a sequence of diphone models 152 has been derived from the sequence of speech 150 to be recognized, each of the resulting diphone models is matched against each of the diphone-types listed in the diphone-type occurrence list 132 described with regard to FIG. 16. In FIG. 17 this comparison is shown schematically as being performed for a given diphone model 152A.

In the preferred embodiment, the comparison between the diphone model 152A and each of the diphone-types is performed by comparing the pre-boundary model 154A and post-boundary model 156A from the observed diphone model 152A against each of the cluster models 126 calculated by the clustering process described with regard to FIG. 14. A likelihood score is calculated for each such comparison indicating the likelihood that each observed boundary model belongs to the class of sounds represented by each such cluster model. Then a score 160 is calculated for the likelihood that the entire observed diphone model 152A belongs to the class of sound represented by each of the diphone-type 158 listed in the diphone-type occurrence list. This is done, for each diphone-type, by combining the two likelihood scores produced by comparing the two boundray models 154A and 156A from the observed diphone-model 152A with two boundary cluster models 126A and 126B associated that diphone-type. In the preferred embodiment, these likelihood scores correspond to the logarithms of the likelihoods they represent. As a result, the likelihood scores for the two boundary models 154A and 156A can simply be added to calculate the likelihood score for the comparison between an observed diphone model 152A and a given diphone-type 158.

Once the likelihood score 160 has been calculated to indicate the similarity between a diphone model 152 and a diphone-type 158, a fixed threshold constant 162 is added to that score to produce a diphone-type match score 164. Since the likelihood scores 160 are logarithms of the likelihoods they represent, and since the likelihoods they represent have values between zero and one, the likelihood scores have negative values which are closer to zero the closer their associated diphone models 152 are to their associated diphone-types 158. The threshold constant 162 is added to these likelihood scores to produce a diphone-type match score 164 for those of them which have which have an absolute value less than that the threshold constant which is positive, and which has a value which is larger the larger the likelihood that its associated diphone-type matches the segment boundary represented by the observed diphone model 152A.

After this addition, all the diphone-type match scores 164 which have a value below zero are thresholded out from further consideration, as is indicated by the threshold line 166 in FIG. 17. The threshold constant 162 is selected so that a given diphone-type match score will be thresholded out only if it appears that the sound represented by its diphone-type does not match the portion of speech represented by its diphone-model. If, on the other hand, a given diphone-type has a match score of zero or above, and thus passes the threshold, it is considered to have matched the portion of the speech represented by that score's associated diphone model 152 well enough to warrant further consideration.

For each diphone-type 158 whose match score is positive for a given observed diphone model 152A, the present invention finds the row 135 in the diphone-type occurrence list which is associated with that diphone-type 158. Each entry 136 in that row identifies a word in which that diphone-type occurs and a temporal displacement indication which indicates the number of frames which normally occur between that diphone-type and the start of that word. For each such entry the method associates with the speech to be recognized an evidence score 166 for that entry's associated row. It places each such evidence score at a location in the speech which is displaced from the location at which the entry's associated diphone-type 158 matches that speech by the number of frames stored in the entry's temporal displacement indication. The value of each evidence score 166 is equal to the value of the match score 164 which indicates the closeness the match between its associated diphone-type and the speech.

In FIG. 17 this process of associating evidences scores 166 with the speech in response to each match against a diphone-type 158 is illustrated for two diphone-type "CO-C3" and "C175-C3". The diphone-type "CO-C3" represents the empty cluster "CO" followed by an "sh" sounds. A match against this diphone-type produces evidence scores for words like "sheet", "sheeting", and "show" which start with "sh" or a similar sound. Since this diphone-type starts with the empty cluster, it always occurs as the first diphone of a word, and, thus, the temporal displacement indication associated with each of its occurrences is always zero. This causes all the evidence score which this diphone-type produces to be associated with the frame immediately following the segment boundary 110 which it matches. The diphone-type "C175-C3" represents an "uh"-like sound followed by an "sh"-like sound. A match against this diphone-type provides evidence for words like "mushy", "hush", and "azure." Since this diphone-type does not include the empty cluster CO, it can occur anywhere in a word, except at its boundary. Thus, the evidence scores it produces are placed at different distances 170 relative to its match against the speech, depending on the temporal displacement indication associated with each occurrence of that diphone-type in word.

Figure 18:
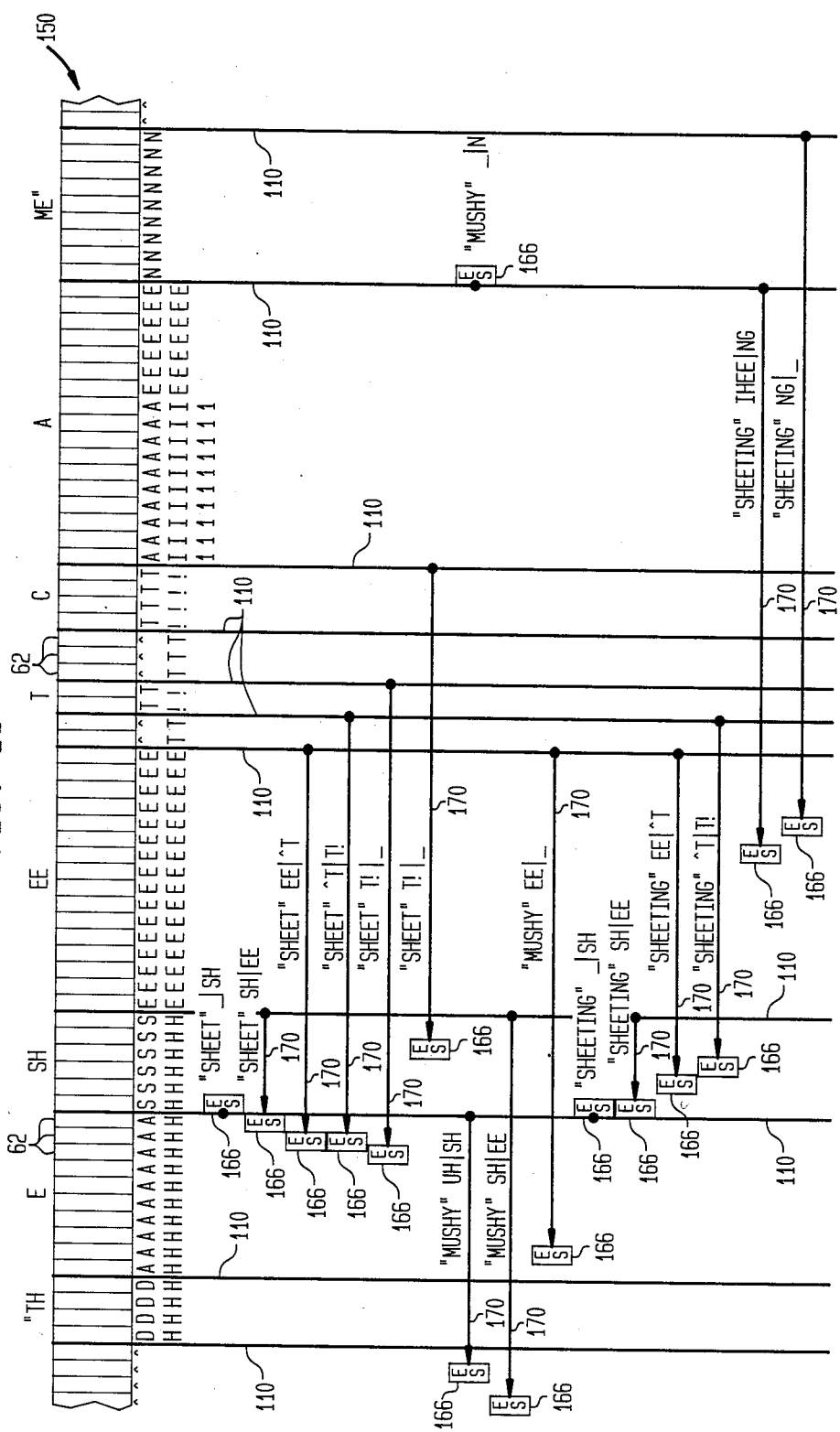
FIG. 18 is a schematic representation of the evidence scores produced for each of three words by the method of FIG. 17.

Referring to FIG. 18, once this process of FIG. 17 has been performed for each of the diphone models 152 associated with the sequence 150 of speech to be recognized, a plurality of evidence scores 166 for each of a large numbers of words will be associated with that speech. FIG. 18 illustrates the evidences scores associated with just three of these words, "sheet", "mushy", and "sheeting".

As can be seen from this figure, every time a segment boundary 110 is detected which is acoustically similar a segment boundary in a given word, evidence for that word will be placed in the speech. As a result evidence scores tend to be distributed throughout the speech. But since the preferred embodiment of the combined-displaced-evidence method displaces each evidence score from the diphone-type match which gave rise to it by the distance between that diphone-type and the beginning of that score's associated word, a word which has a sequence of sounds similar to that occurring in the speech will tend to have its evidence scores grouped together near the location at which that word would start if it actually occurred in the speech. In the example of FIg. 18, it can be seen that the evidence scores 166 for the word "sheet" are grouped together close to the segment boundary 110 which is actually associated with the start of that word. Evidence for the word "sheeting", which starts with a similar sequence of sounds, is also clustered around that boundary.

Figure 19:
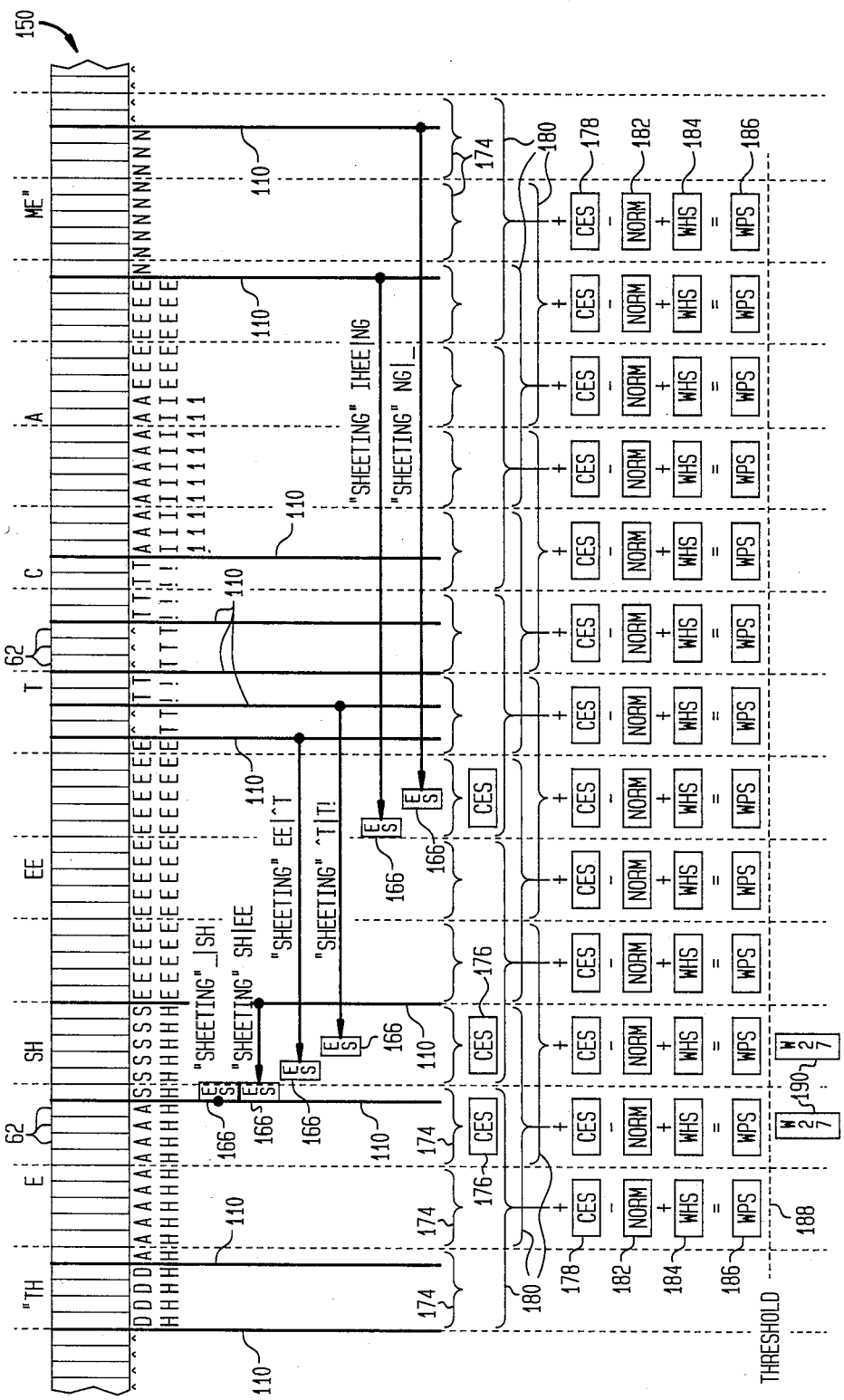
FIG. 19 is a schematic representation of the method by which a preferred embodiment of the present invention combines the evidence scores for a given word at each of a plurality of combining times to determine where, in the speech to be recognized, the word should be selected as a candidate for the start of dynamic programming.

Referring to FIG. 19, once all the evidence scores 166 have been associated with a given section of speech 150, all the evidence scores associated with a given word are combined at each of a plurality of successive regions in the speech. This process is illustrated in FIG. 19 for the word "sheeting." It first divides the speech up into a plurality of successive blocks 174, each of which is five frames long. Then it combines all the evidences scores 166 for the given word which occur within each block 174 to produce a combined evidence score 176. Then for each block of five frames it calculates a word evidence score 178 by combining that block's own combined evidence score 176 with the two combined evidences scores 176 calculated for each of its neighboring blocks of five frames. Thus each word evidence score 178 is calculated by adding all the evidence scores for its associated words which occur over a combining time which is fifteen frames in duration.

After a word evidence score 178 has been calculated for each block of five frames, it has a word normalization constant 182 subtracted from it. This word normalization constant is calculated separately for each vocabulary word. It is calculated by multiplying an average-contribution constant by the number of diphone-type models associated with the given word. The average-contribution constant is an empirically chosen constant which reflects the average evidence score generated for a word by a diphone-type when that word does not actually occur in the portion of speech for which such evidence scores are being generated. This normalization score is subtracted from each word evidence score 178 to reduce the tendency of evidence scores for long words to be greater than those for short words. This is necessary because long words tend to have more diphone-types associated with them than short word. The more diphone-types a word has, the more likely it is to have random evidence scores generated for it, even if the word is not actually spoken, because of random matches of such diphone-types against the speech to be recognized.

After the normalization score 182 has been subtracted from each word evidence score 178, a word histogram score 184 is added to the resulting difference to produce a word prefilter score 186. The calculation of the histogram score 184, which is performed separately for each block 174 of five frames, is described below with regard to FIGS. 20 and 21. Each word prefilter scores 186 calculated for a block of five frames indicates the probability that its associated vocabulary word starts in that block of frames. After a word prefilter score 186 has been calculated in a given frame block for each vocabulary word, the resulting scores are thresholded, and each word whose scores 186 passes the thresholding is selected as word candidates 190 for the start of dynamic programming in that block.

In the preferred embodiment, this thresholding selects the words with the N best scores 186 for each block of five frames as word candidates 190 for that frame block, where N is the number of words upon which it is desirable to let the system start dynamic programming at any one time. N should be large enough that if the speech actually contains the start of a given word in a frame block, that given word will have a very high chance of being selected as a word candidate. But N should be small enough that the computational requirement of starting dynamic programming against that number of words will not be excessive.

The present invention tends to provide a lot of evidence for words at locations in which they do not actually occur in the speech. This is demonstrated in FIG. 18 by the evidence scores for the words "mushy" and "sheeting" which do not occur in the speech shown there. This evidence for erroneous words results because the diphone-types which occur as part of actually spoken words are also associated with many other words which have not been spoken. Evidence is also produced for words which have not been spoken as a result of limits in the accuracy of the acoustic signal processing used in the preferred embodiment, as a result of background noise which obscures the true acoustic signals, and as a result mispronunciations, which are common in speech.

But the combined-displaced-evidence scheme of the present invention is quite tolerant of such erroneous evidence scores because evidence scores for a given word are only likely to be grouped together if there is a sequence of matches between the speech and the diphone-type models for that word, and if those matches occur in roughly the same temporal distribution as they do in that word. In addition, since the preferred embodiment uses the combined-displaced-evidence scheme in prefiltering, it does not need to be terribly accurate. As long as it has a high probability of listing the correct word in the top N best scoring words, as is described above, it is sufficient for prefiltering purposes.

Figure 20:
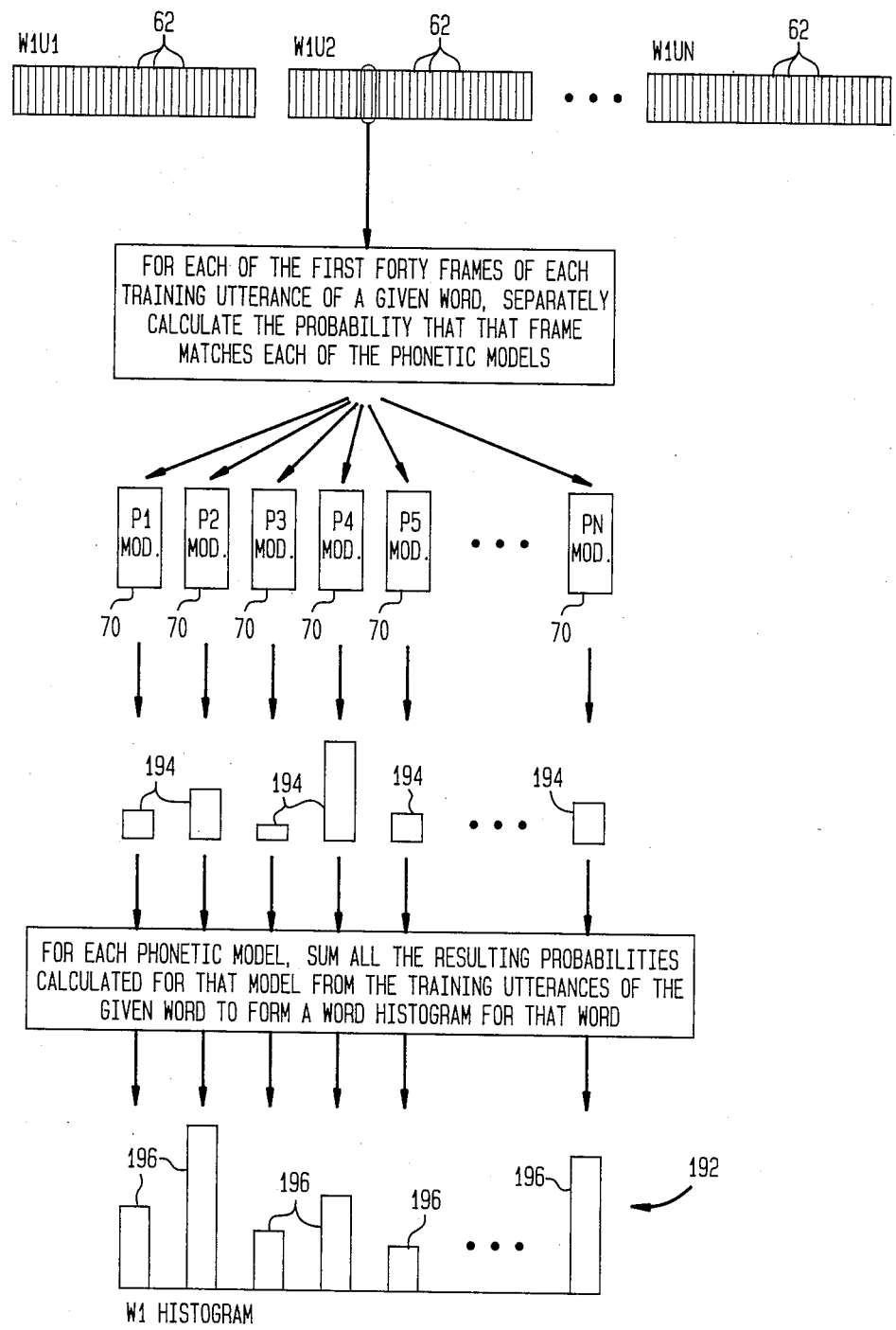
FIG. 20 is a schematic representation of the method by which a preferred embodiment of the present invention derives a histogram for individual vocabulary words.
Figure 21:
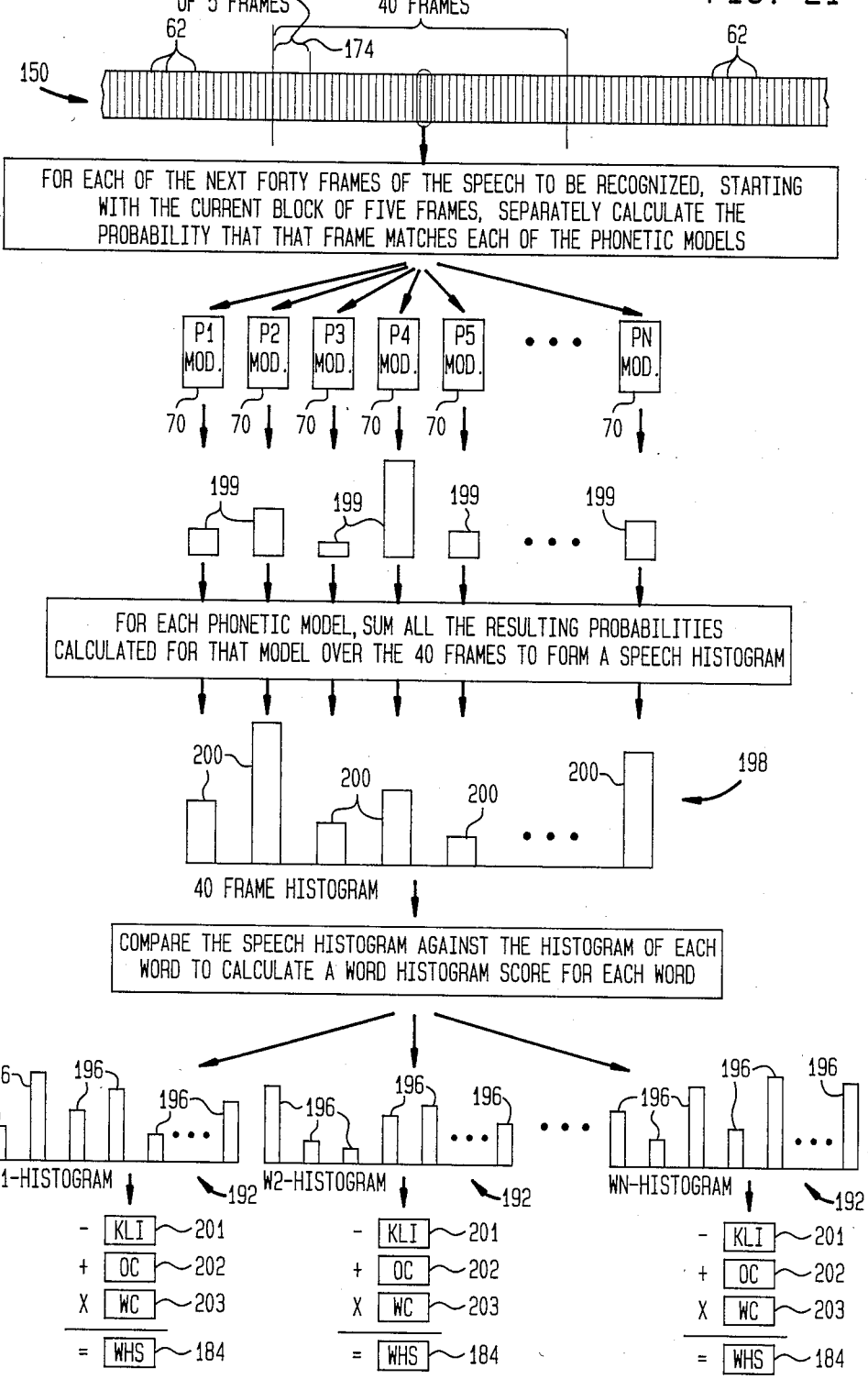
FIG. 21 is a schematic representation of the method by which a preferred embodiment present invention derives a histogram from a portion of speech to be recognized and compares that histogram against the histogram of each of a plurality of vocabulary words derived according to the method of FIG. 20 to calculate an indication of which of vocabulary words most probably correspond to the speech.

FIGS. 20 and 21 illustrate the method of deriving the word histogram scores 184, which are added to the normalized word evidence scores to produce the word prefiltering scores 186, as is described above with regard to FIG. 19.

Before word histogram scores can be calculated for a given vocabulary word, a histogram 192 has to have been previously derived for that word. In the preferred embodiment this is done by the method shown in FIG. 20, which compares each of the first forty frames of each of a plurality of training utterances of that vocabulary word against each of the phonetic frame models 70 represented in Table 1. As a result a separate probability score 194 is calculated for the comparison of each such frame against each such phonetic model. This score represents the probability, Prob(PX F), that the sound represented by its given phonetic frame model PX occurred, given that the current frame F has been observed. This probability can be calculated from the likelihood, Prob(F|PX), that the observed frame F belongs to the class of sounds represented by the probability distribution of the given phonetic frame model PX. As those skilled in Bayesian analysis will appreciate, the probability Prob(PX|F) can be calculated from this likelihood score by the formula:

$$Prob(PX \mid F) = \frac{Prob(PX)Prob(F \mid PX)}{Prob(P1)Prob(F \mid P1) + Prob(P2)Prob(F \mid P2) + \ldots Prob(PN)Prob(F \mid PN)} \quad \text{Eq. (5)}$$

where Prob(PK) is the a priori probability that a given frame of speech corresponds to the phonetic frame model K, where K varies from 1 through N; and where N is the total number of phonetic frame models used in the histogram method. In the preferred embodiment, the histogram prefiltering method uses forty-four phonetic frame models 70 whose labels are listed in Table 1.

After each frame has been compared against each phonetic frame model, the resulting probability score 194 associated with each phonetic frame model is added to a sum 196 of the probability scores calculated for that phonetic frame model as a result of comparisons against other frames from a given vocabulary word. Once this has been completed for the first forty frames from a plurality of training utterances of the given vocabulary word, each of the sums 196 is normalized. This is done by dividing each of those sums by the total number of frames over which they have been calculated. Each of the resulting normalized sums 196 indicates the probability that a given frame from forty frames of speech to be recognized will correspond to a given phonetic frame model if those forty frames are the first forty frames of the vocabulary word for that sum 196 has been calculated. Taken together, all the probabilities 196 calculated for a given word constitute a vocabulary word histogram 192.

Referring now to FIG. 21, once a histogram model 192 has been calculated for each vocabulary word, the histogram prefiltering method of the preferred embodiment uses these models to derive a word histogram score 184 for each vocabulary word in each block 174 of five frames. For each such frame block 174, the histogram prefiltering method first calculates a histogram 198 of the forty frames of speech which start with that block. This histogram 198 is calculated in the same basic manner as are the vocabulary word histograms 192. That is, each of the forty frames is compared against each of the phonetic frame models 70. As a result of each such acoustic comparison a probability 199, $Prob(PX|F)$, is produced which represents the probability that the sound represented by the comparison's phonetic frame model PX was spoken, given that the current frame F has been observed. The probability 199 produced by each such comparisons is added to the sum 200 of such probabilities calculated for its associated phonetic frame model. After this process has been completed for all forty frames, all of the sums 200 are normalized by dividing them by forty, so that each represent the total probability that a random one of the forty frames corresponds to its phonetic frame model. Once this has been done, the sums 200 from a speech histogram 198.

After a speech histogram 198 has been calculated for the forty frames starting with the current frame block 174, that histogram is compared against each of the vocabulary word histograms 192 to determine to which of those vocabulary words it compares most closely. In the preferred embodiment, this comparison process is performed by finding the Kullback-Leibler information value 201, which provides a measure of the difference between two probability distributions. The formula used to derive this Kullback-Leibler information value, or KLI, is as follows:

$$KLI = \text{Sum}_{from\ i=1\ to\ N}[SHP_i \log (SHP_i/WHP_i)] \qquad \text{Eq. (6)}$$

where
- $SHP_i$ is the speech histogram probability 200 for a given phonetic frame label i; and
- $WHP_i$ is the vocabulary word histogram probability 196 for the phonetic frame label i.

The KLI 201 produced for the comparison of a given speech histogram 198 against a given vocabulary word histogram 192 has a positive value which is closer to zero the closer its speech histogram matches its vocabulary word histogram. But the word evidence score 178, which is combined with the results of the histogram prefiltering as shown, in FIG. 19, increases in value as the probability of its associated word increases. To make the result of the histogram prefiltering also increase with increases in word probability, each KLI 201 is subtracted from an offset constant 202. The value resulting from this subtraction is then multiplied by weighting constant 203, to produce the word histogram score 184.

Each word histogram score 184 indicates the probability that its associated word starts in the five frames of the current block 174, based on a comparison of histograms. The weighting constant is chosen empirically, based on performance results, to determine how much of each word prefilter score 186 should be based on the histogram method and how much should be based on the combined-displaced-evidence method.

It should be appreciated that in other embodiments of the invention, other methods of calculating word histogram scores can be used. For example, one can calculate both the vocabulary word histogram 192 and the speech histogram 198 by selecting the single phonetic model 70 which has the best acoustic match against each frame from which such a histogram is calculated. As a result of each such selection of a phonetic label, a count of the number of times that the phonetic label has been selected for that histogram is incremented by one. After this process has been repeated for each frame over which the histogram is calculated, the total count for each frame is normalized by dividing it by the total number of frames used to calculate the histogram. Once such histograms have be calculated for each vocabulary word and for the speech to be recognized, the speech histogram is compared against each vocabulary word histogram by the same method as that described above.

Figure 22:
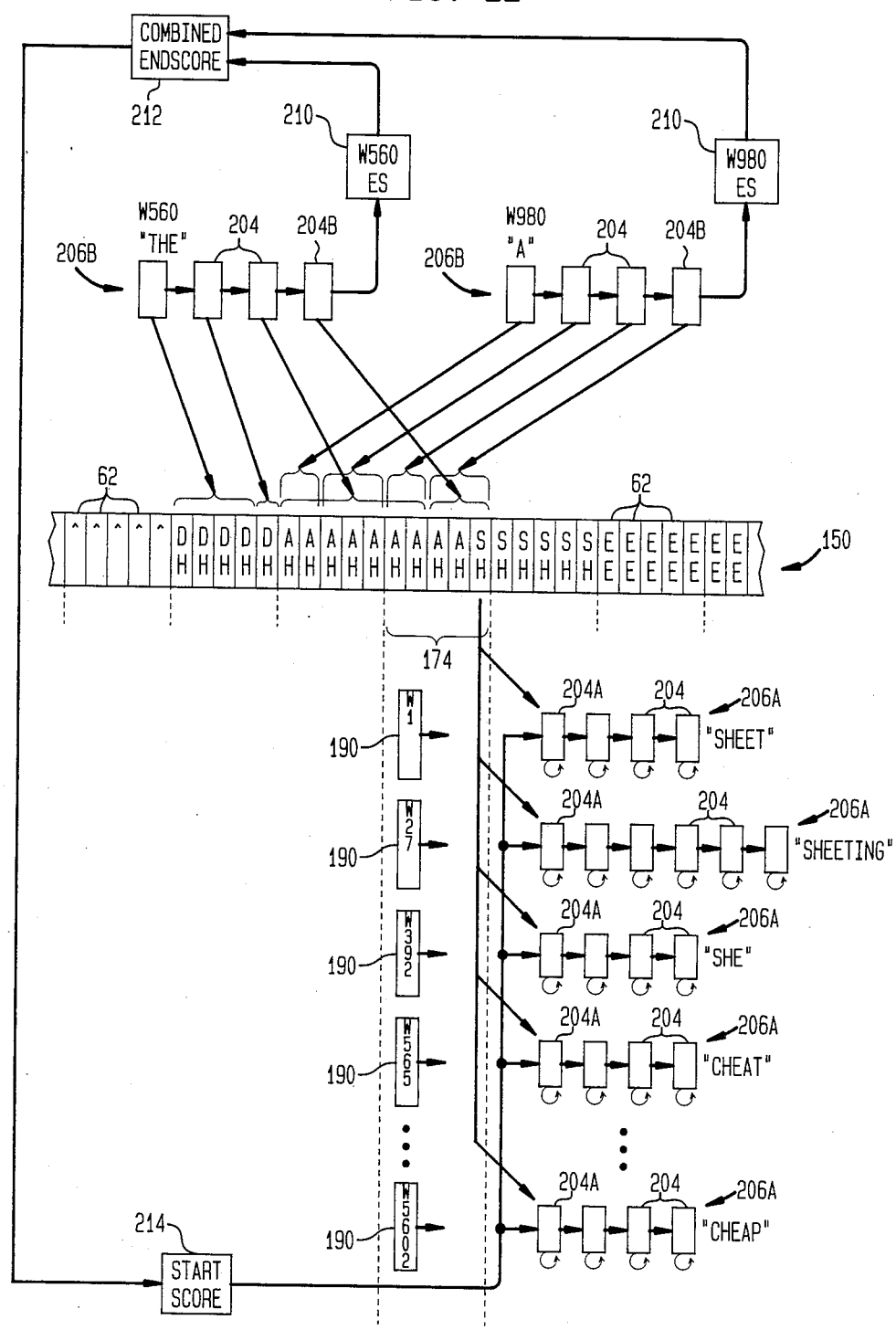
FIG. 22 is a schematic representation of the method by which a preferred embodiment of the present invention uses each of a plurality of words selected as word candidates for a given time period by the method of FIG. 19 as candidates for the start of dynamic programming during that time period.

Referring now to FIG. 22, when the process of FIG. 19 is performed on a given block 174 of five frames for each vocabulary word, it selects a group of word candidates 190 for the start of dynamic programming, or DP, in that frame block. The selection of a word as such a candidate causes the first node 204A of that word's dynamic programming model 206A to be seeded by the DP at each frame of the frame block at which the DP indicates that a match between the speech and one or more previously seeded word models 204B has been completed.

As is indicated schematically in FIG. 22, the DP used in the preferred embodiment attempts to time align each node 204 of each previously seeded word model 206B against one or more frames 62 of the speech to be recognized. Each node 204 consists of an acoustic model which has the same mathematical form the phonetic frame models 70. The DP also produces a DP score for each word which indicates the extent to which each node 204 of its word model 206B compare against each frame against which that node has been time aligned. Whenever the DP time aligns all the nodes of a previously seeded word model 206B against the speech so as to produce a DP score which is above a certain threshold, a separate endscore 210 is produced for that word in association with each frame time aligned against the last node of that word model. The value of each such endscore equals that of the DP score for its word up to its associated frame.

All the endscores 210 produced at a given frame for all previously seeded word models 206B are added to produce a combined endscore 212. Then, for each given frame in which there is one or more endscore above threshold, the resulting combined endscore 212 is used as the startscore 214 for the frame which follows the given frame. Each such startscore is used to seed, in the frame for which it is produced, DP of the first node 204A of the word candidate 190 selected for the frame block 174 in which that given frame occurs. This startscore is combined with the acoustic likelihood score which results from comparing the startscore's associated frame against the first node 204A of each such word candidate. The resulting combined score for a given word candidate is that candidate's DP score for the frame, and it indicates the probability that the first node 204A of that word candidate corresponds to that frame. If this score is above a given threshold for a given word, the DP will be continued against other nodes of that word's model 206A.

A wide variety of well known DP techniques can be used with the present invention. The DP method used in the embodiment of the invention tested by the inventor is basically similar to that disclosed in application Ser. No. 797,249, except that (1) application Ser. No. 797,249's prefiltering scheme is replaced with the prefiltering scheme of the present invention; (2) application Ser. No. 797,249's startscore is replaced with the startscore 214 of the present invention; (3) rather than calculating a single endscore for each word, as is disclosed in application Ser. No. 797,249, a separate endscore is calculated and stored for each frame time aligned against the last node of each word model; (4) application Ser. No. 797,249's use of the variable "norm" is discarded or changed to reflect the fact that the DP is run continuously, and starts against different words at different times; and (5) the decision as to which word matches a given point in the speech is based not only upon which word has the best endscore at a given point in the speech, but also upon which word appears most probable in terms of the identity and starting time of the words which appear to follow it.

Figure 23:
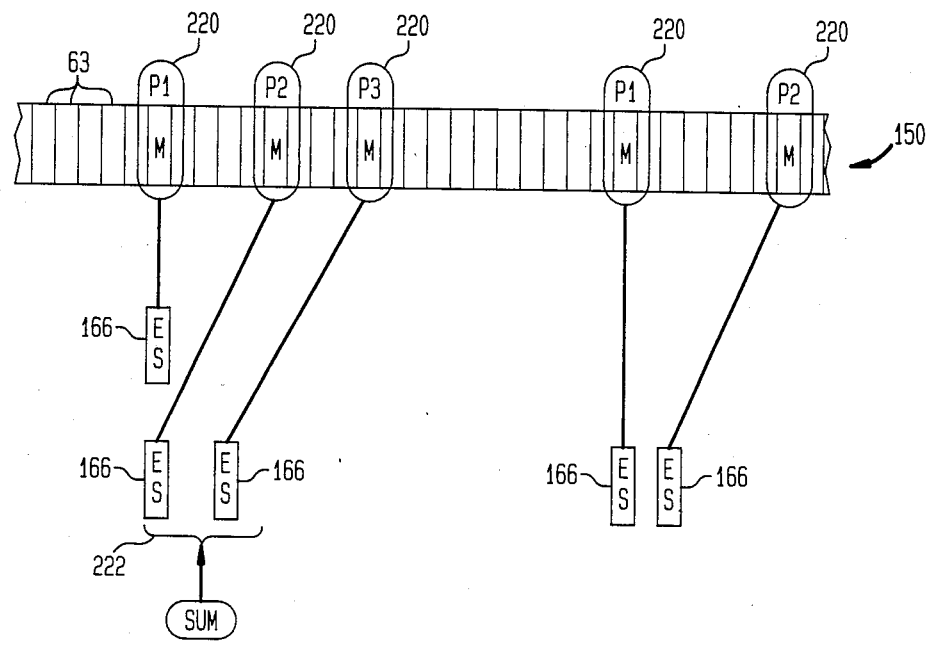
FIG. 23 is an abstract representation of the method by which the process of FIGS. 16-19, associates a displaced evidence score for a given word model with one frame in response to each match against an acoustic model and then combines all the evidence scores for that word which occur over a range of frames.
Figure 24:
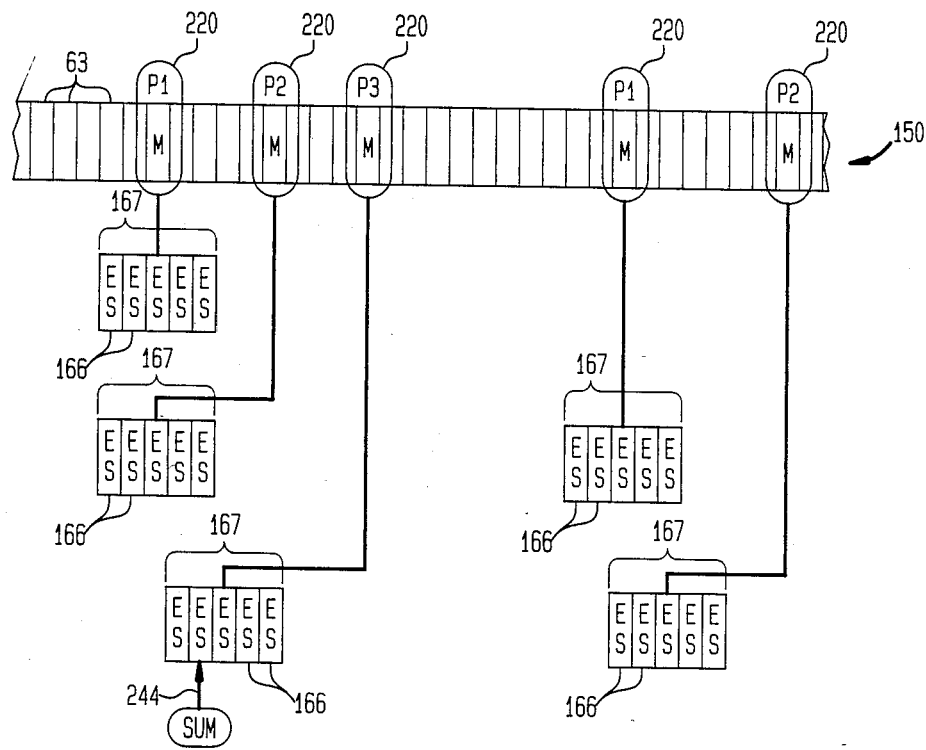

FIGS. 23 through 28 are schematic representations of alternate method of practicing the combined-displaced-evidence method of the present invention. In FIGS. 23 through 25 different types of temporal distributions of evidence scores are associated with the matches 220 detected between acoustic pattern and the speech to be recognized.

FIG. 23 is a schematic representation of the version of the combined-displaced-evidence method described above with regard to FIGS. 17 through 19. In this version, each match detected between a given acoustic pattern, such as a diphone-type, and the speech to be recognized causes a single evidence score 166 to be produced in response to each known occurrence of the given acoustic pattern in a vocabulary word. Each such evidence score is displaced in the speech from the acoustic match which gives rise to it by a distance equal to the temporal displacement indication associated with that score's corresponding occurrence of an acoustic pattern in a given vocabulary word. In this version of the combined-displaced-evidence score the temporal distribution of one or more evidence scores produced for each known occurrence of a matched acoustic pattern in a given word consist of a single evidence score. The location of this temporal distribution is determined by that evidence score's associated temporal displacement indication.

In the embodiment of FIG. 23, the probability that a given word starts at a given location in the speech is determined by combining all the evidence scores 166 for that word which are placed within a given combining time, where the combining time consists of a range 222 of frames. Since the combining time is a range of frames it is possible to combine evidence scores whose temporal distributors have different locations.

FIG. 24 is a schematic representation of another version of the combined-displaced-evidence method. In this version each match between a given acoustic pattern and the speech causes an evidence score 166 to be associated with each frame in a range 167 of frames in association with each known occurrence of the given acoustic pattern in a vocabulary word. The location of each such range relative to the match is determined by a temporal displacement indication of the type described above. In this embodiment, the combining time 224 over which evidence scores are summed is only one frame in duration. Since the temporal distribution of evidence scores which results from each acoustic match extends over multiple frame, it is possible for evidence scores from temporal distributions which have slightly different locations to overlap the single frame of the combining time, and thus to be combined. It can be seen that the methods of combining displaced evidence scores shown in FIGS. 23 and 24 are basically equivalent to each other.

FIG. 25 is a schematic representation of yet another version of the combined-displaced-evidence method. In this version, the temporal displacement indication associated with the occurrence of a matched pattern in a given vocabulary word includes not only the distance at which the temporal distribution 226 of evidence scores should be positioned relative to its associated match, but also the shape of that temporal distribution. The shape of each such distribution is selected so that the amount of the evidence score which it associates with a given distance from its associated match (as indicated by the height of the curve in FIG. 25) corresponds to the probability that its associated word would start at that distance from the occurrence of the matched acoustic pattern, as determined from prior utterances of that word. In the embodiment shown, a simplifying assumption is made that each such probability distribution is a Laplacian distribution, of the type described above. This lets the temporal displacement indication store each such probability distribution with just two values, a mu, indicating the average distance between an acoustic pattern and the beginning of a given word, and a sigma, indicating the absolute deviation of such distances.

In this embodiment of FIG. 25, like that of FIG. 24, the combining time 228 over which evidence scores are summed is only one frame in duration. But since each temporal distributions of evidence scores covers a range of frames, scores from distributions with slightly different locations can be combined.

FIG. 26 shows a version of the combined-displaced-evidence method which is calculated in a different manner than that described in FIG. 25, but which has the same basic effect. The method of FIG. 26 calculates the probability that a given word starts near a given scoring, or combining, time 230 by associating with each of a plurality of acoustic patterns P1, P2, P3, . . . associated with the word a range 167 of expected times. In the preferred embodiment of the this method, each of these ranges of expected times is represented by a probability distribution 226, which have the same form as the probability distributions shown in FIG. 25. The location of each of these ranges is determined relative to the scoring time 230 as a function of the temporal displacement indication associated with that range's acoustic pattern and word.

The method of FIG. 26 produces an evidence score for each match of an acoustic pattern which is detected during the range 167 of expected times associated with that acoustic pattern for the given word. In the preferred embodiment, the amount of each evidence score is determined by the height of the probability distribution 226 at the location of the acoustic pattern match which gives rise to that score. In FIG. 26 this amount is indicated for each of the matches 220 by the filled-in area 231 under the probability distribution 226 associated with each match's acoustic pattern. The first three matches shown in FIG. 26 each have relatively large evidence scores associated with them, but the last two do not have significant evidence scores associated with them, since they occur outside the range of frames in which the probability distributions 226 associated with their acoustic patterns have significant values.

The method of FIG. 26 then combines all evidence scores for a given word to produce a score indicating the probability that the word starts in the vicinity of the scoring time 230. As with all the versions of the combined-displaced-evidenced method described above, the process of calculating the probability that a given word starts at a given location, is preferably repeated for each of a succession of location in the speech.

In all the versions of the combined-displaced-evidence method shown in FIGS. 23 through 26, the method can combine evidence scores produces for a given word as a result of a plurality of acoustic pattern matches, even if the relative location of those matches is slightly different than that which is indicated by the temporal displacement indications for that word, and even if matches expected for the word do not occur, or even if matches in addition to those expected for the word do occur. As a result, the combined-displaced-evidence score is quite tolerant of changes in speaking rate and minor insertions and deletions of undesired speech sounds.

Figure 27:
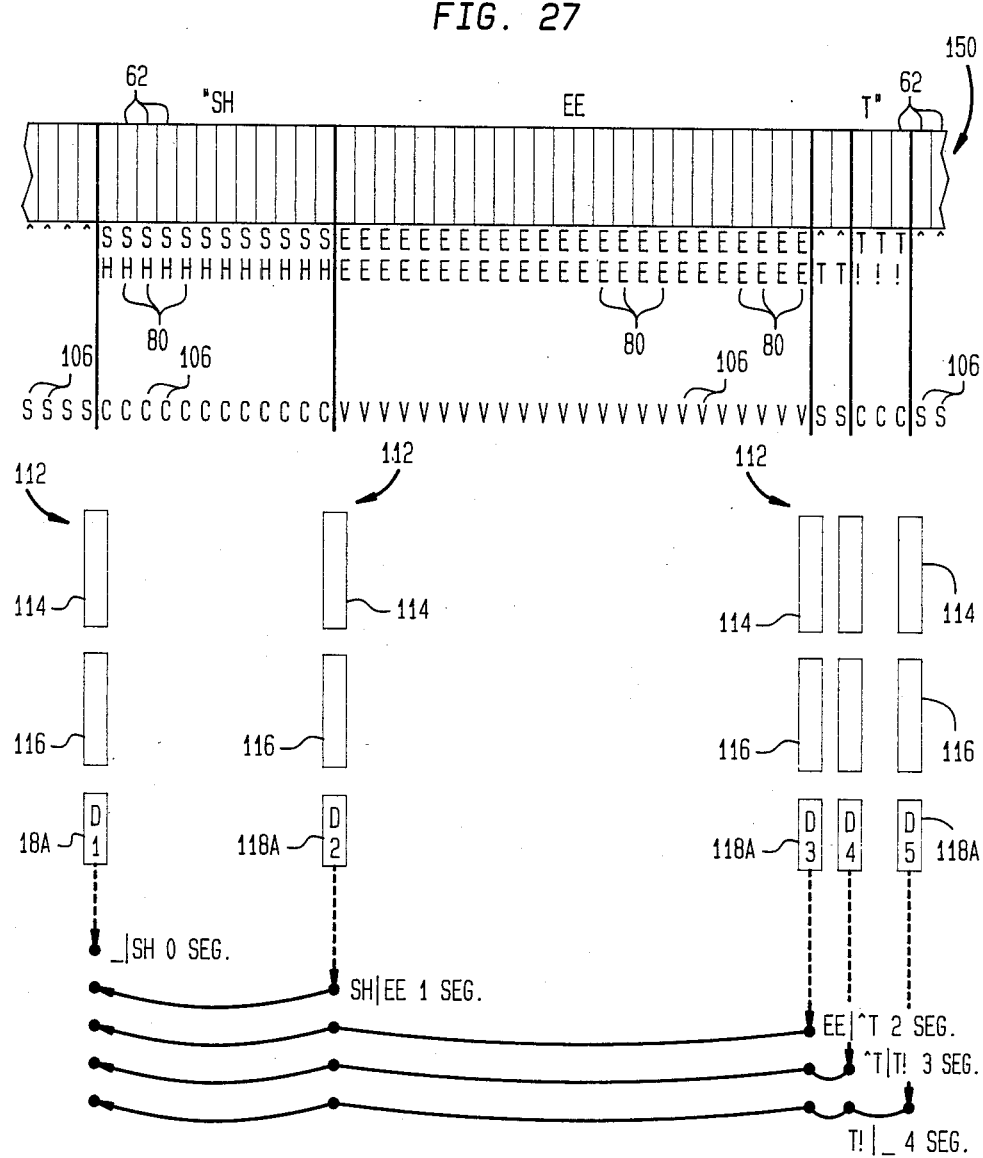
FIG. 27 shows an alternative embodiment of the present invention in which the temporal displacement indications associated with the occurrence of each diphone-type model in each vocabulary word are stored in terms of a number of segments rather a number of frames.
Figure 28:
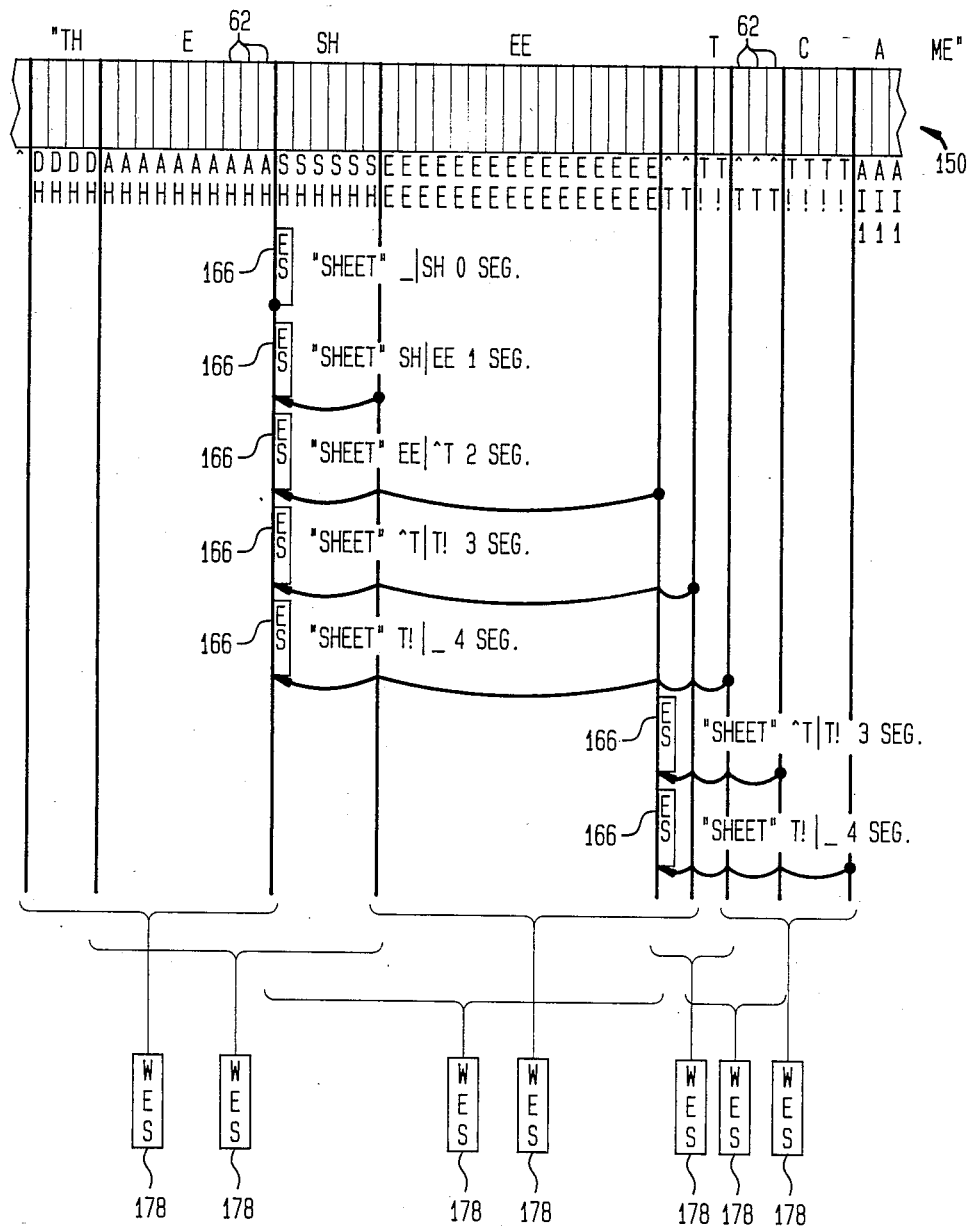
FIG. 28 is a schematic representation of the method by which temporal displacement indications of the type derived by the method of FIG. 27 are used during recognition.

FIGS. 27 and 28 relate to another embodiment of the combined-displaced-evidence method which is very similar to that described above with regard to FIGS. 13 through 19, except that the temporal displacement indication, instead of being recording in terms of a number of frames, is recorded in terms of a number of phonetic class segments. The method of FIG. 27 derives its word models in the same manner as that described above with regard to FIG. 13, except that the temporal displacement indications 118A for each diphone model records the number of segment between that diphone model and the beginning of the word.

As FIG. 28 shows, at recognition time the evidence score produced for a given word as a result of each diphone-type match is displaced relative to the location of that match by the number of segments stored in the temporal displacement indication associated with the matched diphone-type and the given word. The major benefit of recording the displaced evidence scores in terms of segments, instead of frames, is that the length of segments change to compensate for changes in the speaking rate, but the length of frames do not. Thus the version of the combined-displaced-evidence method which stores displacements in terms of segments is less adversely affected by changes in speaking rate than the version, described above, which records displacement in terms of frames.

It can be seen that the present invention provides a method of reducing the amount of computational required for speech recognition, and, in particular, for continuous speech recognition. It does this by reducing the number of words upon which dynamic programming is started at any point in the speech to a small subset of the system's vocabulary. The words select for the start of DP in a given portion of speech are those which appear most likely to start in that portion, as is indicated by the combination of the combined-displaced-evidence method and the histogram method. Although the combined-displaced-evidence method and the histogram method are not as accurate as DP, they take much less computation when used with a large vocabulary and they are sufficiently accurate to reduce the number of candidates for DP to a manageable number, while at the same time making it very likely that the correct word will be one of the word candidates.

It can also be seen that the present invention provides a method of determining the probability of whether a given word occurs at a given location in the speech which is efficient and yet which also is relatively tolerant of changes in speaking rate and minor insertions or deletions of speech sounds. Both methods are also relatively tolerant of changes in speaking rate. The combined-displaced-evidence method is particularly tolerant of changes in speaking rate if its temporal displacement indications are made in terms of segments, as is described above with regard to FIGS. 27 and 28.

It can also be seen that the smoothed frame labeling of the present invention provides a relatively accurate method for associating phonetic labels with the individual frames of speech, and which also makes the segmentation based on such labeling more accurate.

The combined-displaced-evidence method described above is used for prefiltering. It should be understood however that in some embodiments of the invention the combined-displaced-evidence method can be used in the most computationally intensive stage of speech recognition. In the description above, the acoustic patterns used in the combined-displaced-evidence method are diphone-types. In other embodiments of this method other types of acoustic patterns could be used, such as phonetic frame labels, segment labels, syllable patterns, or patterns recognized by more complicated feature extraction schemes.

In the above description of the combined-displaced-evidence score, an acoustic pattern is considered to "match" a given portion of the speech, and thus to warrant the production of evidence scores, only if the probability that the acoustic pattern corresponds to the portion of the speech is above a certain threshold. This is the most efficient embodiment, since it avoids the computational expense of producing evidence scores for unlikely acoustic matches. But it is possible, however, to make an embodiment of combined-displaced-evidence method in which each comparison between an acoustic model and a portion of the speech is considered a "match" for which evidence scores are produced, regardless of how low the probability that the acoustic model corresponds to the speech.

In the above description of the combined-displaced-evidence score, the temporal displacement indications all indicate the distance between the occurrence of a given diphone-type and the beginning of words in which they occur. It should be understood, however, that in other embodiments of the invention the temporal displacement indications could indicate the distance between each such diphone-type and another reference point in the word, such as the end of the word. In an embodiment where this reference point was the end of each word, for example, evidence scores would tend to cluster at locations in the speech at which their corresponding words ended.

In the description above the combined-displaced-evidence method and the histogram prefiltering method are used to determine which words most probably occur in the speech. In other embodiment of the invention these method could be used to determine which speech units most probably correspond to speech, where the speech units are speech units other than words, such as syllables or word clusters.

In the description above, the frame parameters used are spectral, slope, and difference parameters. It should be understood that in other embodiments of the invention frames with parameters other than the spectral, slope, or difference parameters can be used. For example, frames comprised of linear predictive coding parameters can be used with the present invention.

In the description above, the probability distributions used in the phonetic frame models 70, the cluster models associated with the diphone-types 158, and the temporal evidence score distributions 226 are all Laplacian distributions, each dimension of which is defined by a mu, or means, and a sigma, or absolute deviation. It should be understood that other types of probability distributions can be used with the present invention, such as probability distributions which use other measures of central tendency beside means, and other measures of spread besides the absolute deviations, In the preceding description of smoothed frame labeling, the neighboring frames whose labels are taken into consideration when labeling a given frame are frames which are immediately before or immediately after the given frame. In other embodiments of the invention, however, such neighboring frames could include frames which are slightly further removed from the given frame.

In the preceding text and in the claims that follow, the phrase "dynamic programming," or "DP," is meant, unless specified otherwise, to broadly include all methods used in the art of speech processing for optimally time aligning a sequence of frames against a sequence of nodes or arcs. The phrase is meant to include both the Viterbi algorithm and the Baum-Welch algorithm, even though some purists consider the Baum-Welch algorithm to be a "DP-like" rather than actual DP algorithm.

Accordingly, the present invention should not be considered to be limited by the description herein of the preferred embodiment, but rather should be interpreted in accordance with the following claims:

What I claim is:

1. A method of speech labeling comprising:
representing speech to be labeled as a sequence of acoustic frames;
storing a plurality of acoustic frame models, each of which represents a certain class of sounds, with the acoustic models representing at least twenty different phonetic classes of sound;
storing a plurality of transition probabilities, each of which indicates the probability that a frame associated with a first acoustic model will neighbor a frame associated with a second, but not necessarily different, acoustic model;
associating one or more of the acoustic models with a given frame as a function of (a) the closeness with which the given frame compares to each of a plurality of the acoustic models, (b) an indication of which one or more of the acoustic models most probably correspond with a frame which neighbors the given frame, and (c) one or more transition probabilities which indicate, for one or more acoustic models associated with the neighboring frame, the probability that the given frame is associated with a given acoustic model; and
labeling each frame in said sequence of acoustic frames with a label identifying said one or more associated acoustic models.

2. A method of speech segmentation comprising:
representing speech to be segmented as a sequence of acoustic frames;
storing a plurality of acoustic frame models, each of which represents a certain type of sound, with each such acoustic model being associated with a class of one or more such acoustic models;
storing a plurality of transition probabilities, each of which indicates the probability that a frame associated with a first acoustic model will neighbor a frame associated with a second, but not necessarily different, acoustic model;
associating one or more of the acoustic models with each of a sequence of frames, with the acoustic model associated with each given frame of the sequence being selected as a function of (a) the closeness with which the given frame compares to each of a plurality of the acoustic models, (b) an indication of which one or more of the acoustic models most probably correspond with a frame which neighbors the given frame, and (c) one or more transition probabilities which indicate, for one or more acoustic models associated with the neighboring frame, the probability that the given frame is associated with a given acoustic model;
comparing the class of the acoustic models associated with neighboring frames in the sequence of frames to detect where in that sequence one or more boundaries occur between regions associated with different classes of acoustic models;
marking the subsequence of frames between each boundary in said sequence of frames and the next boundary in said sequence as a segment.

3. A method of word hypothesization in continuous speech comprising:
representing speech to be analyzed as a sequence of acoustic frames;
storing a plurality of acoustic frame models, each of which represents a certain type of sound;
storing a plurality of transition probabilities, each of which indicates the probability that a frame associated with a first acoustic model will neighbor a frame associated with a second, but not necessarily different, acoustic model;
associating one or more of the acoustic models with each of a sequence of frames, with the acoustic model associated with each given frame of the sequence being selected as a function of (a) the closeness with which the given frame compares to each of a plurality of the acoustic models, (b) an indication of which one or more of the acoustic models most probably correspond with a frame which neighbors the given frame, and (c) one or more transition probabilities which indicate, for one or more acoustic models associated with the neighboring frame, the probability that the given frame is associated with a given acoustic model;
using the one or more acoustic models associated with the individual frames in the sequence of frames to select which of a plurality of vocabulary word models are to be hypothesized as occurring at or near the speech represented by the said frames associated with said one or more acoustic models; and hypothesizing said selected vocabulary word models.

4. A continuous speech recognition method comprising said method of word hypothesization as described in claim 3 and further comprising:

using dynamic programming to match each of said hypothesized words models against the portion of said sequence of acoustic frames associated with said hypothesized word models to determine the probability of the word represented by each of said hypothesized word models as being the word corresponding to said portion of said sequence of acoustic frames; and selecting the sequence of words with the highest probability as computed by said dynamic programming as the recognized sequence of words.

5. A method of speech-unit hypothesization in continous speech comprising:

storing a model of each of a plurality of speech units, where each such speech unit model associates an individual diphone model with each of a plurality of segment boundaries associated with its speech unit, where each such segment boundary is located between two sound segments, each of which represents a succession of sounds from the speech unit which are relatively similar to each other, and where each diphone model includes a pre-boundary model of the sound preceding its associated segment boundary and a post-boundary model of the sound following that boundary;

dividing a portion of speech to be analyzed into a plurality of segments of relatively acoustically similar portions;

deriving a diphone model of each of a plurality of boundaries between such segments, with each such diphone model including a pre-boundary model of the sound preceding its associated segment boundary and a post-boundary model of the sound following that boundary;

matching the diphone models derived from the speech to be analyzed against the diphone models associated with speech-unit models to determine which speech units most probably correspond to a given portion of the speech to be analyzed; and hypothesizing said most probable speech units.

6. A continuous speech recognition method comprising said method of speech-unit hypothesization as described in claim 5 wherein said speech-units are words, and further comprising:

using dynamic programming to match each of said hypothesized words against the portion of said sequence of acoustic frames associated with said hypothesized word to determine the probability of each of said hypothesized words as being the word corresponding to said portion of said sequence of acoustic frames; and selecting the sequence of words with the highest probability as computed by said dynamic programming as the recognized sequence of words.

7. A method of speech-unit hypothesization as described in claim 5, wherein said dividing of a portion of speech to be recognized into a plurality of segments comprises:

representing the speech to be analyzed as a sequence of acoustic frames;

storing a plurality of acoustic frame models, each of which represents a certain type of sound, with each such acoustic frame model being associated with a class of one or more such acoustic frame models;

storing a plurality of transition probabilities, each of which indicates the probability that a frame associated with a first acoustic frame model will neighbor a frame associated with a second, but not necessarily different, acoustic frame model;

associating one or more of the acoustic frame models with each of a sequence of frames, with the acoustic frame model associated with each given frame of the sequence being selected as a function of (a) the closeness with which the given frame compares to each of a plurality of the acoustic frame models, (b) an indication of which one or more of the acoustic frame models most probably correspond with a frame which neighbors the given frame, and (c) one or more transition probabilities which indicate, for one or more acoustic models associated with the neighboring frame, the probability that the given frame is associated with a given acoustic model; and comparing the class of the acoustic frame models associated with neighboring frames in the sequence of frames to detect where in that sequence one or more boundaries occur between regions associated with different classes of acoustic frame models, wherein said boundaries are used in said step of dividing said portion of speech into a plurality of segments.

8. A method of speech-unit hypothesization as described in claim 5, wherein the speech units are words.

9. A method of speech-unit hypothesization as described in claim 5, wherein the diphone models associated with each speech unit which are compared against diphone models from the speech to be recognized are diphone-type models which are derived by:

dividing one or more prior utterances of the speech unit into segments of relatively acoustically similar portions;

deriving initial diphone models for the boundaries which result from such segmentation, with each such initial diphone model having a pre-boundary model of the sound preceding its segment boundary and a post-boundary model of the sound following that boundary; and representing groups of relatively similar initial diphone models from different speech units with diphone-type models, with each initial diphone model in such a group being represented by a common diphone-type model, and with each diphone-type model having two sub-models, one representing the pre-boundary models of its associated initial diphone models, and one representing the post-boundary models of those initial diphone models.

10. A method of speech-unit hypothesization in continuous speech comprising:

storing a plurality of acoustic patterns;

associating with each such acoustic pattern the occurrences of that pattern which are known to occur in one or more speech units, and storing for each such known occurrence the speech unit in which it occurs and a temporal displacement indication which indicates the temporal distance, during utterances of that speech unit, between that occurrence and a given reference point in the speech unit;

detecting a plurality of matches between such acoustic patterns and various portions of the speech to be analyzed;

producing, in response to each such detected match, a temporal distribution of one or more evidence scores in association with each of one or more of said known occurrences of the matched acoustic pattern, with each such temporal distribution being produced for the given speech unit in which its associated known occurrence of the matched pattern occurs, and with each such temporal distribution being displaced in the speech relative to its associated matched acoustic pattern as a function of the temporal displacement indication associated with its known occurrence of the matched pattern;

calculating a speech-unit-probability score indicating the probability that a given speech unit occurs in the speech to be recognized in association with a given combining time, including combining the evidence scores for the given speech unit, if any, which are associated with the given combining time in the speech, with the combining of evidence scores including, in some instances, the combining of evidence scores for the given speech unit from different temporal distributions which have different locations relative to the given portion of speech to be analyzed; and hypothesizing as occurring at the point in time corresponding to said given portion of speech, one or more speech units which have the highest speech-unit-probability scores for said given portion of speech.

11. A continuous speech recognition method comprising said method of speech-unit hypothesization as described in claim 10 wherein said speech-units are words, and further comprising:

using dynamic programming to match each of said hypothesized words against the portion of speech to be analyzed associated with said hypothesized word to determine the probability of each of said hypothesized words as being the word corresponding to said portion of speech; and selecting the sequence of words with the highest probability as computed by said dynamic programming as the recognized sequence of words.

12. A method of speech-unit hypothesization as described in claim 10, wherein:

the speech to be analyzed is divided into a plurality of acoustic segments, each of which represents a portion of speech associated with a given class of sounds, with the length of time associated with a given segment being determined by the length of the speech signal associated with that segment's class of sound;

the temporal displacement indication associated with a known occurrence of a given acoustic pattern in a given speech unit indicates the number of such segments, during utterances of that speech unit, which exist between the occurrence of the given acoustic pattern and a given reference point in the speech unit; and the temporal distribution of evidence scores associated with the speech for a given speech unit in association with the match of a given acoustic pattern is displaced relative to that match by a number of such segments determined as a function of the temporal displacement indication associated with that acoustic pattern for that speech unit.

13. A method of speech-unit hypothesization as described in claim 10, wherein:

the speech to be analyzed is represented as a sequence of evenly timed acoustic frames;

the temporal displacement indication associated with a known occurrence of a given acoustic pattern in a given speech unit indicates the number of frames, during utterances of the speech unit, between the known occurrence of the given acoustic pattern and a given reference point in the speech unit; and the temporal distribution of evidence scores associated with the speech for a given speech unit in association with the match of a given acoustic pattern is displaced relative to that match by a number of frames determined as a function of the temporal displacement indication associated with that acoustic pattern for that speech unit.

14. A method of speech-unit hypothesization as described in claim 10, wherein the speech-unit-probability score calculated for a given speech unit is normalized as a function of the number of acoustic patterns for which matches are normally found as a result of an occurrence of the given speech unit in the speech to be analyzed.

15. A method of speech-unit hypothesization as described in claim 10, wherein:

the acoustic patterns are diphone models;

the diphone models associated with each speech unit are derived by dividing one or more prior utterances of the speech unit into segments of relatively acoustically similar portions, and each diphone model includes a pre-boundary model of the sound preceding one boundary between such segments and a post-boundary model of the sound following that boundary;

said detecting of a plurality of matches between acoustic patterns and various portions of the speech includes: (1) dividing a portion of speech to be analyzed into a plurality of segments of relatively acoustically similar portions; (2) deriving a diphone model for each of a plurality of boundaries between such segments, with each such diphone model including a pre-boundary model of the sound preceding its segment boundary and a post-boundary model of the sound following that boundary; and (3) comparing the diphone models derived from the speech to be analyzed against the diphone models associated with speech units to determine which speech units most probably match the portions of the speech represented by the diphone model derived from the speech.

16. A method of speech-unit hypothesization as described in claim 15, wherein said dividing of a portion of speech to be analyzed into a plurality of segments comprises:

representing the speech to be analyzed as a sequence of acoustic frames;

storing a plurality of acoustic frame models, each of which represents a certain type of sound, with each such acoustic frame model being associated with a class of one or more such acoustic frame models;

storing a plurality of transition probabilities, each of which indicates the probability that a frame associated with a first acoustic frame model will neighbor a frame associated with a second, but not necessarily different, acoustic frame model;

associated one or more of the acoustic frame models with each of a sequence of frames, with the acoustic frame model associated with each given frame of the sequence being selected as a function of (a) the closeness with which the given frame compares to each of a plurality of the acoustic frame models, (b) an indication of which one or more of the acoustic frame models most probably correspond with a frame which neighbors the given frame, and (c) one or more transition probabilities which indicate, for one or more acoustic frame models associated with the neighboring frame, the probability that the given frame is associated with a given acoustic frame model;

comparing the class of the acoustic frame models associated with neighboring frames in the sequence of frames to detect where in that sequence one or more boundaries occur between regions associated with different classes of acoustic frame models.

17. A method of speech-unit hypothesization as described in claim 10, wherein each of a plurality of the speech units represents a word.

18. A continuous spech recognition method comprising said method of speech-unit hypothesization as described in claim 10, wherein:

the calculating of a speech-unit-probability score of a given speech unit is repeated for each of one or more speech units for each of a sequence of said combining times associated with successive portions of said speech to be analyzed;

the speech units with the best speech-unit-probability scores for each of said combining times are selected for a more intensive comparison against the speech to be recognized in the vicinity of their corresponding combining time; and the sequence of words with the best scores from said more intensive comparisons is selected as the recognized sequence of words.

19. A method of speech-unit hypothesization as described in claim 10, wherein:

the speech to be analyzed is represented as a sequence of acoustic frames;

the temporal distribution of one or more evidence scores, which is produced in association with a known occurrence of a given acoustic pattern in a given speech unit in response to a match of that acoustic pattern against a portion of the speech, associates all its evidence score with a single frame in the speech to be analyzed; and the combining time covers a range of frames, so that evidence scores, if any, for a given speech unit which are associated with different frames within the combining time's range of frames are combined to calculate the speech-unit-probability score.

20. A method of speech-unit hypothesization as described in claim 10, wherein:

the speech to be analyzed is represented as a sequence of acoustic frames;

the temporal distribution of one or more evidence scores, which is produced in association with a known occurrence of a given acoustic pattern in a given speech unit in response to a match of that acoustic pattern against a portion of the speech, associates its evidence score with a range of frames in the speech to be analyzed.

21. A method of speech-unit hypothesization as described in claim 20, wherein the combining time is only one frame in length and the combining of evidence scores combines evidences scores whose range of frames overlap the frame of the combining time.

22. A method of speech-unit hypothesization as described in claim 20, wherein said temporal distribution causes the amount of the evidence score associated with a given frame in said range of frames to be determined as a function of a probability distribution which represents the probability that the reference point of the given speech unit would be located, in a given utterance of the speech unit, at each of a plurality of temporal distances from the known occurrence of the acoustic pattern associated with the temporal distribution.

23. A method of speech-unit hypothesization comprising:

storing a plurality of acoustic models, each of which represents a given class of sounds which occurs as part of one or more speech units;

associating with each of a plurality of speech units one or more of the acoustic models, with each occurrence of an acoustic model associated with a given speech unit having a corresponding temporal displacement indication which indicates the temporal displacement, during utterances of the speech unit, between the occurrence of that acoustic model and a given reference point in that speech unit;

finding, for each of a plurality of the acoustic models, evidence for one or more matches of that acoustic model against successive portions of the speech to be analyzed;

calculating a speech-unit-probability score, which indicates the probability that a given speech unit occurs in a given region of the speech, as a function of (a) the evidence found that one or more acoustic models associated with the given speech unit match one or more portions in the speech, (b) the location in the speech at which the evidence for such matches is found, and (c) the temporal displacement indications associated, for the given speech unit, with the acoustic model for which such evidence is found, where whether or not a contribution is made to a given speech-unit-probability score as a result of the evidence found for each of a plurality of matches of acoustic models against the speech to be analyzed is independent of what, if any, evidence is found for the match of the other acoustic models associated with that speech unit; and hypothesizing as occurring at or near the point in time corresponding to said given region of speech, one or more speech units which have the highest speech-unit-probability scores for said given region of speech.

24. A continuous speech recognition method comprising said method of speech-unit hypothesization as described in claim 23 wherein said speech-units are words, and further comprising:

using dynamic programming to match each of said hypothesized words against the portion of said speech to be analyzed associated with said hypothesized word to determine the probability of each of said hypothesized words as being the word corresponding to said portion of speech; and selecting the sequence of words with the highest probability as computed by said dynamic programming as the recognized sequence of words.

25. A method of speech-unit hypothesization as in claim 23, wherein the amount of the contribution made as a result of the evidence of each of said plurality of matches to a given speech-unit probability score is independent of the amount of the contributions made to that probability score as a result of the evidence of the other of said matches.

26. A method of speech-unit hypothesization comprising:
    storing a plurality of acoustic models, each of which represents a given class of sound which occurs as part of one or more speech units;
    associating with each of a plurality of speech units one or more of the acoustic models, with each occurrence of an acoustic model associated with a given speech unit having a corresponding temporal displacement indication which indicates the temporal displacement, during utterances of the speech unit, between the occurrence of that acoustic model and a given reference point in that speech unit;
    finding, for each of a plurality of the acoustic models, evidence for one or more matches of that acoustic model against successive portions of speech to be analyzed; and
    as a result of the evidence found in the speech for each of a plurality of matches of acoustic models associated with a given speech unit, associating one or more evidence scores for the speech unit with the speech in a temporal distribution determined as a function of the temporal displacement indication for that acoustic model in that speech unit, with that temporal distribution being independent of the temporal distribution of the evidence scores associated with the speech as a result of any other matches of acoustic models associated with the given speech unit;
    combining the resulting one or more evidence scores for the given speech unit which are associated with a given combining time within the speech so as to calculate a speech-unit-probability score that indicates the probability that the given speech unit occurs in the speech in association with the combining time; and
    hypothesizing as occurring at said combining time one or more speech units which have the highest speech-unit-probability scores for said given combining time.

27. A method of speech-unit hypothesization comprising:
    storing a plurality of acoustic models, each of which represents a given class of sounds which occurs as part of one or more speech units;
    associating with each of a plurality of speech units one or more of the acoustic models, with each occurrence of an acoustic model associated with a given speech unit having a corresponding temporal displacement indication which indicates the temporal displacement, during utterances of the speech unit, between the occurrence of that acoustic model and a given reference point in that speech unit;
    finding, for each of a plurality of the acoustic models, evidence for one or more matches of that acoustic model against successive portions of speech to be analyzed;
    calculating a speech-unit-probability score for a given speech unit, which indicates the probability that the given speech unit occurs in the speech in association with a given scoring time in the speech, said speech-unit-probability score being calculated by (1) associating with each of a plurality of acoustic models associated with the speech unit a range of expected times determined relative to the scoring time as a function of the temporal displacement indication associated with each such acoustic model for the given speech unit; (2) producing an evidence score for each acoustic model for which evidence of a match is found during the range of expected times associated with that acoustic model and the given speech unit; and (3) combining the evidence scores so produced for the given speech unit; and
    hypothesizing as occurring at said given scoring time one or more speech units which have the highest speech-unit-probability scores for said given scoring time.

28. A method of speech-unit hypothesization in continuous speech comprising:
    storing a plurality of acoustic models, each of which represent a given class of sound which occurs as part of one or more speech units;
    storing a histogram for each of a plurality of speech units, with each such histogram indicating, for each of a plurality of acoustic models, the total probable number of matches between that acoustic model and a given portion of one or more utterances of that speech unit;
    calculating a histogram for a portion of speech to be analyzed which indicates the total probable number of matches between each of the given plurality of acoustic models and that portion of speech;
    comparing the histogram calculated for the portion of speech to be analyzed against the histograms for each of a plurality of speech units to calculate speech-unit-probability scores which indicate which speech units most probably corresponds to the speech to be analyzed; and
    hypothesizing as occurring at or near the time corresponding to said portion of speech one or more speech units with the highest speech-unit-probability scores for said portion of speech; wherein:
    the histogram which is calculated for the speech to be analyzed derives most of its information from a sampling window, that is, a portion of the speech to be analyzed which is approximately the same length as the portions of speech from which the histograms of the speech-unit models are made;
    this histogram is repeatedly re-calculated, with the sampling window being shifted relative to the speech be analyzed in successive re-calculations;
    the resulting histograms which are calculated for each of a plurality of different positions of the sampling window are each compared against the histograms of the speech units to determining which of those speech units most probably correspond to each of those different sampling window positions.

29. A speech recognition method comprising a method of speech-unit hypothesization as described in claim 28, wherein:
    the speech-unit-probability scores calculated by comparing histograms of the speech to be analyzed against histograms of speech-unit models is used to select which one or more speech units receive a more computationally intensive comparison against the speech to be analyzed; and
    selecting as the recognized word sequence the word sequence which is determined by said more computationally intensive comparison to be the most probable word sequence corresponding to the speech to be analyzed.

* * * * *